(12) United States Patent
Duong et al.

(10) Patent No.: US 12,423,749 B2
(45) Date of Patent: Sep. 23, 2025

(54) CREDIT LINE ADJUSTMENT

(71) Applicant: Wells Fargo Bank, N.A., San Francisco, CA (US)

(72) Inventors: Tai T. Duong, Des Moines, IA (US); Alexander Foote, West Chester, PA (US); Christine C. Gherlone, Clayton, CA (US); Gerald Guinn, Concord, CA (US); Oyenola Ogunyemi-Craig, North Brunswick, NJ (US); Joanna J. Prebeck, Johnston, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/451,474

(22) Filed: Aug. 17, 2023

(65) Prior Publication Data

US 2023/0394572 A1 Dec. 7, 2023

Related U.S. Application Data

(63) Continuation of application No. 17/111,106, filed on Dec. 3, 2020, now Pat. No. 11,776,051, which is a
(Continued)

(51) Int. Cl.
*G06Q 40/03* (2023.01)
*G06F 3/0482* (2013.01)
(Continued)

(52) U.S. Cl.
CPC .......... *G06Q 40/03* (2023.01); *G06F 3/0482* (2013.01); *G06Q 10/10* (2013.01);
(Continued)

(58) Field of Classification Search
None
See application file for complete search history.

(56) References Cited

U.S. PATENT DOCUMENTS 7,409,369 B1 8/2008 Homuth et al.
7,552,080 B1 6/2009 Willard et al.
(Continued)

FOREIGN PATENT DOCUMENTS

WO WO-2012167165 A2 * 12/2012 ............. G06Q 20/20
WO 2014018821 A3 4/2014

OTHER PUBLICATIONS

Hongkiat Technology Design Inspiration, "Digital Wallets—10 Mobile Payment Systems to Take You There", from internet http://www.hongkiat.com/blog/digital-wallets/.
(Continued)

*Primary Examiner* — Scott S Trotter
(74) *Attorney, Agent, or Firm* — Merchant & Gould P.C.

(57) ABSTRACT

An example credit line adjustment system includes: at least one processor; and memory encoding instructions that, when executed by the at least one processor, causes the at least one processor to generate a graphical user interface including: a first section identifying a first credit line owned by a user, the first section providing a first credit limit amount for the first credit line, and the first section including a first control that receives input from the user to manipulate the first credit line; a second section identifying a second credit line, the second section including a second control that receives input to transfer at least a portion of the first credit line to the second credit line.

16 Claims, 22 Drawing Sheets

Related U.S. Application Data continuation-in-part of application No. 15/218,476, filed on Jul. 25, 2016, now Pat. No. 10,878,496.

(51) Int. Cl.

| | |
|---|---|
| *G06Q 10/10* | (2023.01) |
| *G06Q 20/38* | (2012.01) |
| *G06Q 20/40* | (2012.01) |
| *G06Q 20/42* | (2012.01) |
| *G06Q 30/0226* | (2023.01) |

(52) U.S. Cl.
CPC ..... *G06Q 20/3821* (2013.01); *G06Q 20/4037* (2013.01); *G06Q 20/42* (2013.01); *G06Q 30/0226* (2013.01)

(56) References Cited

U.S. PATENT DOCUMENTS

| | | | |
|---|---|---|---|
| 7,685,064 B1 | 3/2010 | Cox et al. | |
| 8,452,706 B1* | 5/2013 | Moadus | G06Q 40/02 705/40 |
| 8,533,111 B1 | 9/2013 | Hamilton et al. | |
| 8,671,018 B2 | 3/2014 | Thomas et al. | |
| 9,152,858 B2 | 10/2015 | Wang et al. | |
| 9,870,589 B1 | 1/2018 | Arnold et al. | |
| 10,255,598 B1* | 4/2019 | Dean | G06Q 20/363 |
| 2002/0062279 A1 | 5/2002 | Behrenbrinker et al. | |
| 2004/0232225 A1 | 11/2004 | Bishop et al. | |
| 2008/0103959 A1 | 5/2008 | Carroll et al. | |
| 2008/0109378 A1* | 5/2008 | Papadimitriou | G06Q 30/02 705/36 R |
| 2009/0048926 A1 | 2/2009 | Salesky et al. | |
| 2011/0231233 A1 | 9/2011 | Iannace et al. | |
| 2012/0265681 A1 | 10/2012 | Ross | |
| 2013/0030983 A1 | 1/2013 | Fahner | |
| 2013/0151360 A1 | 6/2013 | Scipioni et al. | |
| 2014/0032394 A1 | 1/2014 | Liberty et al. | |
| 2014/0052594 A1* | 2/2014 | Zimmer | G06Q 40/02 705/35 |
| 2014/0279006 A1 | 9/2014 | Calman et al. | |
| 2014/0304154 A1 | 10/2014 | Levchin et al. | |
| 2015/0012400 A1* | 1/2015 | Wassmer | G06Q 20/354 705/35 |
| 2015/0066691 A1 | 3/2015 | Ready et al. | |
| 2015/0100443 A1 | 4/2015 | Van Heerden et al. | |

OTHER PUBLICATIONS

William Charles, "Rules for Reallocating Your Credit Limit with each Card Issuer", Dec. 16, 2014, from internet www.doctorofcredit.com.

* cited by examiner

Your Credit Line Management opportunities

400 — You're eligible for an increased credit limit on your CARD A card. You can use a combination of Credit Line Increase and Credit Line Reallocation.

402 — The current line of credit for the CARD A card is: $2,000

Step 1

404 — Choose your Credit Line Increase amount (How much do you want to increase the line on CARD A)

● $ 8,000 (maximum)  406  410
○ Choose another amount (cannot exceed maximum above)

Step 2

Choose your Credit Line Reallocation amount (How much line do you want to move to CARD A from CARD B)

● $ 4,000 (maximum)  408  412
○ Choose another amount (cannot exceed maximum above)

414 — Your total requested line of credit for the CARD A card is: $14,000

Fig. 5A

Your Credit Line Management opportunities

400 — You're eligible for an increased credit limit on your CARD A card, You can use a combination of Credit Line Increase and Credit Line Reallocation.

402 — The current line of credit for the CARD A card is: $2,000

Step 1
404 — Choose your Credit Line Increase amount (How much do you want to increase the line on CARD A)
○ $ 8,000 (maximum)
● Choose another amount (cannot exceed maximum above) $ [4000] 406    410 [Update]

Step 2
Choose your Credit Line Reallocation amount (How much line do you want to move to CARD A from CARD B)
● $ 4,000 (maximum)
○ Choose another amount (cannot exceed maximum above) [ ] 408    412 [Update]

414 — Your total requested line of credit for the CARD A card is: $10,000

Your Credit Line Management opportunities

You're eligible for an increased credit limit on your CARD A card. You can use a combination of Credit Line Increase and Credit Line Reallocation.

The current line of credit for the CARD A card is: $2,000

Step 1

Choose your Credit Line Increase amount (How much do you want to increase the line on CARD A)

● $ 8,000 (maximum)
○ Choose another amount (cannot exceed maximum above) $ [     ]   [Update]

Step 2

Choose your Credit Line Reallocation amount (How much line do you want to move to CARD A from CARD B)

○ $ 4,000 (maximum)
● Choose another amount (cannot exceed maximum above) [1000]   [Update]

Your total requested line of credit for the CARD A card is: $11,000

Fig. 5C

Your Credit Line Management opportunities

You're eligible for an increased credit limit on your CARD A card. You can use a combination of Credit Line Increase and Credit Line Reallocation.

The current line of credit for the CARD A card is: $2,000

Step 1
Choose your Credit Line Increase amount (How much do you want to increase the line on CARD A)
● $ 6,000 (maximum)
○ Choose another amount (cannot exceed maximum above) $ Step 2
*Choose your Credit Line Reallocation amount (How much line do you want to move to CARD A from CARD B)*
○ *$ 0 (maximum)*
○ *Choose another amount (cannot exceed maximum above)*

Your total requested line of credit for the CARD A card is: $8,000

Fig. 5D

Your Credit Line Management opportunities

You're eligible for an increased credit limit on your CARD A card. You can use a combination of Credit Line Increase and Credit Line Reallocation.

The current line of credit for the CARD A card is: $2,000

Step 1

Choose your Credit Line Increase amount (How much do you want to increase the line on CARD A)

○ $ 6,000 (maximum)
● Choose another amount (cannot exceed maximum above) $  [ 4000 ]

Step 2

Choose your Credit Line Reallocation amount (How much line do you want to move to CARD A from CARD B)

● $ 2,000 (maximum)
○ Choose another amount (cannot exceed maximum above)  [ 2000 ]

Your total requested line of credit for the CARD A card is: $8,000

Fig. 5E

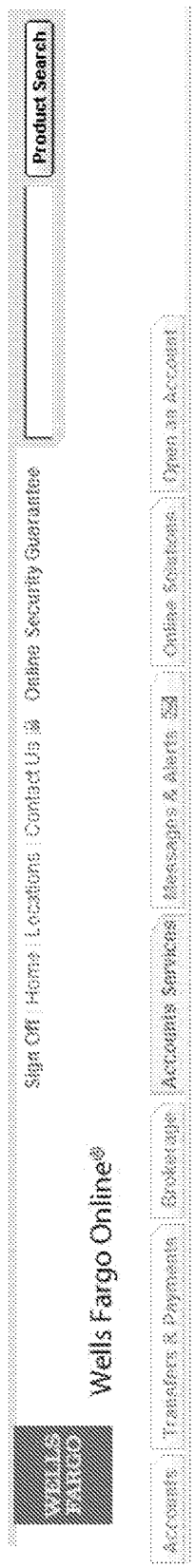
Fig. 6D

Fig. 6E

CREDIT LINE ADJUSTMENT

BACKGROUND

Many consumers have more than one credit card account at any given time. Each credit card account carries its own set of terms and conditions, such as credit limit, APR (Annual Percentage Rate), rewards, promotions, fees, and so forth. Many consumers also maintain multiple credit card accounts through the same provider, e.g., a credit card company or a bank that may also handle the consumer's checking and/or savings account(s).

SUMMARY

In accordance with certain aspects of the present disclosure, a credit line adjustment system is provided that enables credit line adjustments based on one or more consumer spending parameters or triggers. The adjustments may include, for example, a credit line increase on a specific credit card account and/or a credit line reallocation between or amongst two or more credit card accounts. The consumer spending parameters that trigger the adjustment may include, for example, a consumer's purchase history, a consumer's location, a consumer's intent to purchase a particular good or service, a merchant promotion, or one or more of the terms, conditions, promotions, and/or benefits associated with the credit card account itself. Although the specific credit line reallocation examples discussed in the Detailed Description below involve a single credit card account provider, it should be appreciated that the credit line reallocation principles and aspects of this disclosure can be readily applied to a situation in which two or more credit cards may be provided by two or more account providers. That is, in some examples, a credit line allocation can take place between credit card accounts issued by the same account provider; in other examples, a credit line allocation can take place between credit card accounts issued by different account providers.

In accordance with certain aspects of the present disclosure, the credit line adjustment is offered to the consumer in real time, i.e., in immediate or approximately immediate response to a credit line adjustment triggering event. Credit line adjustment triggering events can include both credit line increase triggering events that trigger an increase in the credit limit on a single credit card account and credit line allocation triggering events that trigger the allocation of credit line from one account to another account.

Examples of credit line adjustment triggering events include: the consumer's present location in a particular location, (e.g., a store, a mall, a sports venue); a consumer's visiting of a particular website, the issuance of a merchant offer or promotion (including, e.g., one or more specific terms or conditions associated with the offer or promotion, such as a particular warranty); a consumer's imminent purchase of a particular good or service (i.e., at the point of sale ("POS")); a purchase history trigger (e.g., the age of a product owned by the AH, a certain amount of elapsed time since a prior purchase by the consumer, the amount of usage of a particular product, the repair history of a particular product); or a purchasing preference trigger (e.g., a propensity to use a particular credit card for business purchases, another for relatively large purchases, another for personal items, etc.). Once the consumer has selected a desired credit line adjustment, the adjustment can be actuated in real time by the bank or credit card company. That is, the adjustment can be pre-approved by the bank or credit card company before the adjustment is offered to the consumer.

In accordance with certain aspects of the present disclosure, the consumer may request a credit line adjustment and be approved or denied immediately or approximately immediately, enabling real time credit line adjustments that are prompted by the consumer rather than the account provider. For example, a consumer may anticipate a particular purchase and request a credit line adjustment that puts the consumer in a more advantageous position to make that purchase.

In accordance with certain aspects of the present disclosure, a credit line adjustment system includes a computer server associated with a credit card account provider ("AP"), e.g., a bank or a credit card company, the AP server configured to interact over a data communication network with an account holder's computing device. In some examples, the AP server is also configured to interact over the data communication network with one or more third party (e.g., merchant) servers or computing devices. The credit line adjustment system generates a user interface on the consumer computing device through which the consumer may request, be offered, and/or accept offers for, credit line adjustments.

In accordance with certain aspects of the present disclosure, a credit line adjustment system includes: at least one processor; and memory encoding instructions that, when executed by the at least one processor, causes the at least one processor to generate a graphical user interface including: a first section identifying a first credit line owned by a user, the first section providing a first credit limit amount for the first credit line, and the first section including a first control that receives input from the user to manipulate the first credit line; a second section identifying a second credit line, the second section including a second control that receives input to transfer at least a portion of the first credit line to the second credit line.

In accordance with certain aspects of the present disclosure, a computer implemented method to manage one or more financial products owned by a user includes: sending, to a user device for display on a graphical user interface associated with the user device, a first option to switch from one of the financial products owned by the user to a new financial product; receiving an input from the user device of a selection of the first option; starting a product switching process, the product switching process including: sending, to the user device for display on the graphical user interface, data associated with the financial products owned by user; receiving a selection of a first financial product, wherein the first financial product is one of the financial products owned by the user; sending, to the user device for display on the graphical user interface, data associated with one or more new financial products; receiving a selection of a second financial product, wherein the second financial product is one of the new financial products; and switching from the first financial product to the second financial product.

In accordance with certain aspects of the present disclosure, a financial product management system, includes: at least one processor; and memory encoding instructions that, when executed by the at least one processor, causes the at least one processor to: send, to a user device for display on a graphical user interface associated with the user device, an option to switch from one of the credit card products owned by the user to a new credit card product; upon receiving an input from the user device of a selection of the option, initiate a product switch process that causes the at least one processor to: send, to the user device for display on the graphical user interface, data associated with the credit card products owned by user; receive a selection of a first credit card product, wherein the first credit card product is one of the credit card products owned by the user; send, to the user device for display on the graphical user interface, data associated with one or more new credit card products; receive a selection of a second credit card product, wherein the second credit card product is one of the new credit card products; and switch from the first credit card product to the second credit card product.

DESCRIPTION OF THE DRAWINGS

FIG. 5A is an example user interface display showing user input a screen.

FIG. 5B is another example user interface display showing a user input screen.

FIG. 5C is another example user interface display showing a user input screen.

FIG. 5D is another example user interface display showing a user input screen.

FIG. 5E is another example user interface display showing a user input screen.

FIG. 6D is another example user interface display showing a user input screen.

FIG. 6E is another example user interface display showing a user input screen.

DETAILED DESCRIPTION

In the following Detailed Description, reference is made to the accompanying drawings, which form a part hereof, and in which is shown by way of illustration specific embodiments which may be practiced. The following detailed description, therefore, is not to be taken in a limiting sense.

Features of the credit line adjustment system disclosed herein can benefit each participant associated with a credit card transaction, and can improve how consumers purchase goods and services in general. Among other things, disclosed examples of the credit line adjustment system allow consumers to make credit card purchases on terms that are more advantageous to the consumer, resulting in, e.g., more rewards points, better discounts, or attaching a lower APR to a particular purchase or purchases.

At the same time, the dynamic system of the present disclosure can be programmed to react to real time events affecting consumer purchases and purchasing decisions, empowering consumers to make quick and efficient credit line adjustments, and/or proactively offering to consumers credit line adjustments that benefit the consumer. In this manner the credit line adjustment system can benefit AP's and merchants by encouraging consumers to make purchases they may not otherwise make. Thus, the various computational components involved in credit card transactions and credit line adjustments are improved by features and functionality of the disclosed credit line adjustment system.

Figure 1:
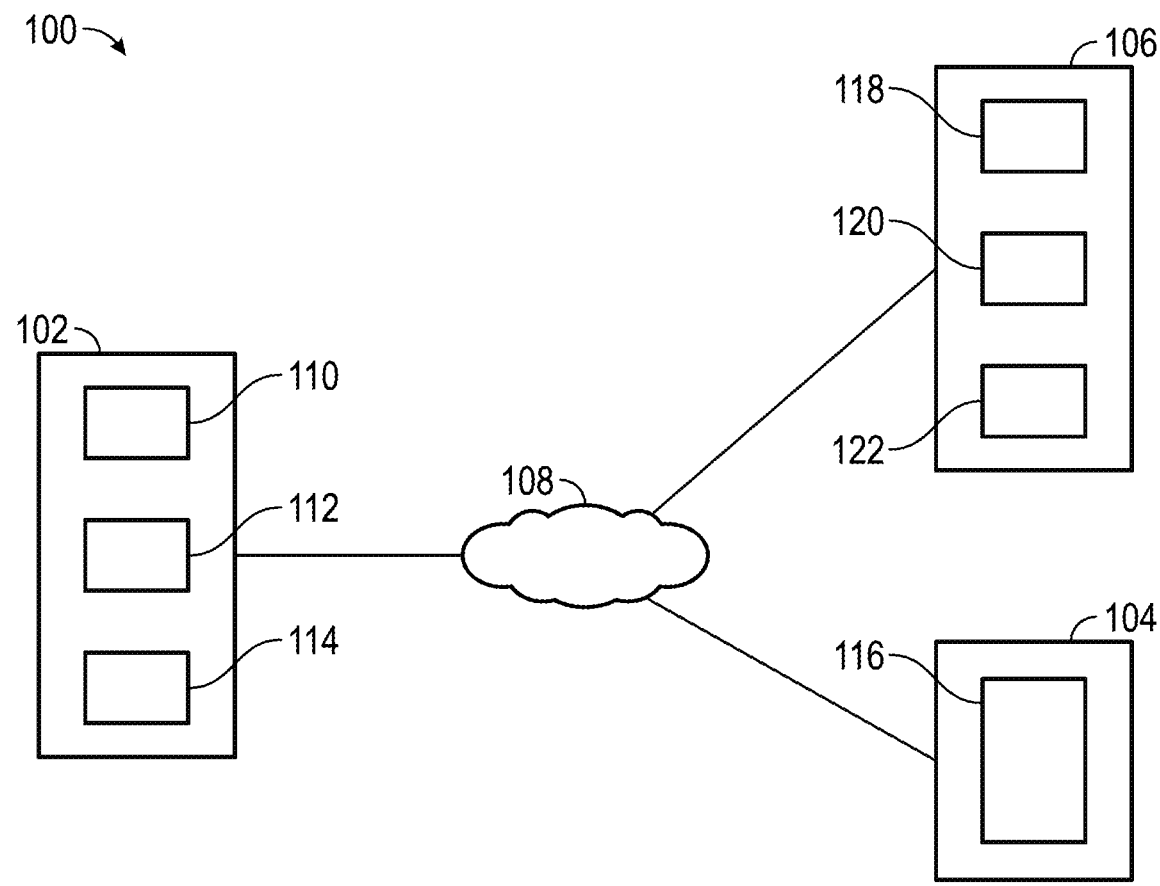
FIG. 1 is a block diagram illustrating an example of a credit line adjustment system in accordance with aspects of the present disclosure.

FIG. 1 is a block diagram illustrating an example of a credit line adjustment system 100 in accordance with aspects of the present disclosure. The system 100 includes a server 102 associated with an AP and at least one user device 104 associated with a credit card account holder ("AH"). Though not required, in this example the system 100 also includes at least one server 106 associated with a third party ("TP"). The AP server 102, the AH device 104 and the TP server 106 interact via a data communication network ("network") 108, e.g., the Internet.

The AP server can include one or more computing devices configured to operate together. The AP server includes one or more databases 110 and one or more modules (112, 114) containing instructions executable by a computer processor, the one or more databases being accessible to the one or more modules.

The one or more databases 110 contain information about one or more credit card account holders associated with the credit card account provider. For example, the one or more databases 110 can store information about the account holders themselves, such as their names, addresses, other account holder identifying information, or promotions offered to the account holders from third parties.

The one or more databases 110 can also store information about the accounts of the account holders, such as account numbers, account standing, type of credit card, balance, credit limit, purchase history, payment history, APR, promotions, points earned, and other terms and conditions associated with the account. The modules can include, e.g., a credit line increase module 112 and a credit line allocation module 114. It should be appreciated that various functionalities of the credit adjustment system disclosed herein can be carried out by one or more of the specifically enumerated modules disclosed, or alternatively by other modules of the system that may not be explicitly disclosed but are configured to carry out the functionality.

The user device 104 is associated with an account holder that holds at least one credit card account. In some examples, the user device 104 is associated with an account holder that holds at least two credit card accounts. The credit line increase module 112 performs credit line increases for one or more of the credit card accounts associated with an account holder. The credit line allocation module 114 performs credit allocations between or amongst two or more credit card accounts associated with an account holder.

The user device 104 can be, e.g., a desktop computer, laptop computer, tablet, personal computer, smart phone, etc. that communicates over the network 108 with the AP server 102. In some examples, the user device 104 also communicates over the network 108 with the TP server 106. The user device 104 includes a user interface 116. The user interface 116 provides an interacting platform between the AH and the AP. In some examples, the user interface 116 also provides an interacting platform between the AH and the TP. For example, the user interface 116 can be configured to display selectable options for credit line allocation or increase, or to display a prompt to the user to propose or request a credit line allocation or increase. The user interface 116 can also display one or more offers or promotions from third party merchants. The user interface can also display prompts that enable the consumer to pay for a good or service using one or more of the consumer's credit cards. The user device 104 is thus configured to receive information and instructions via the network 108 and display them on the user interface 116, and to transmit information and instructions via the network 108 from user inputs on the user interface 116.

The TP server 106 can include at least one database 118 and at least one module (120, 122), the modules 120, 122 containing instructions executable by a computer processor, the one or more databases 118 being accessible to the one or more modules 120, 122. The database 118 can be, for example, a merchant database that includes information about the merchant's products (such as inventory, price, promotions), and information about consumers or potential consumers of the merchant's products (such as consumers' identity, history of purchasing the merchant's products or products similar to the merchant's products, etc.). The module 120 can be a merchant offer module configured to send offers or promotions to purchase one or more of the merchant's products, the offer or promotion being sent to a credit card account holder via the network 108 to the user device 104. Such an offer module can also communicate the contents of the offer or promotion to the AP server 102 via the network 108, so that the AP is aware that a particular purchase offer or promotion has been made available to a credit card account holder.

The module 122 can be a purchase history module that can communicate to the AP or the AH information regarding the account holder's purchase history. For example the module 122 can inform the AP or the AH that, based on the time elapsed since the AH's purchase of a particular good or service from the TP, it may be time for the AH to purchase that good or service again. Thus, the possibility of a credit line adjustment based on purchase history can be communicated to the AH by one or both of the AP and the TP.

Figure 2:
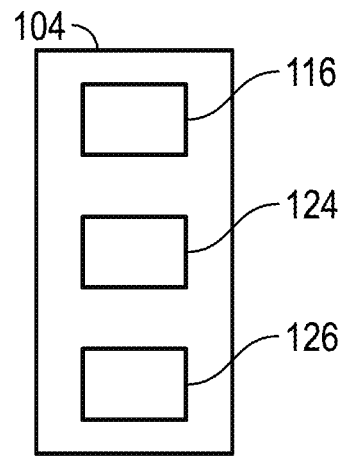
FIG. 2 is a block diagram illustrating an example user device that can be used in the credit line adjustment system of FIG. 1.

FIG. 2 is a block diagram illustrating more details of the example user device 104 that can be used in the credit line adjustment system 100 of FIG. 1. In the example, the user device 104 includes the user interface 116 as described above. In this example, the user device 104 includes an input device 124 and a positioning device 126.

The input device 124 allows the AH to input information or instructions. For example, the input device 124 can be a touch user interface display screen, a voice command interface, a keyboard, a mouse, or another type of input device.

The positioning device 126 locates the user device 104, e.g., via a global positioning system, cellular tower triangulation, or other means. In some examples, the positioning device 126 locates the user device 104 based on the user device's connectivity to a particular Wi-Fi network, such as the Wi-Fi network available at a merchant store. The proximity of a user device 104 to a particular merchant store can be determined from the strength of that store's available Wi-Fi connection at the user device 104. For non-mobile user devices 104, the positioning device 126 can operate through other means, e.g., by identifying an IP address associated with the user device 104. In other examples, the location of the user device 104 can be determined when the AH checks in to a social media account.

The user device 104 can be configured to transmit location information about the user device 104 via the network 108 to the AP server 102 and/or the TP server 106. The AP server 102 and the TP server 106 can be configured to process location information about the user device 104 and send information and/or executable options to the user device 104 about potential purchases and/or credit line adjustments to the user device 104 that are tailored to the device's location. For example, the information and/or executable options are sent when the AH reaches a predetermined minimum physical proximity to the merchant, as communicated by the positioning device 126.

In some examples, one or more features of the credit line adjustment system 100 become available only when enabled by an account holder. For example, an account holder may have to open and/or login to an electronic credit card account residing on the database 110 or to a particular software application residing on the user device 104 in order for the AP server 102 and/or the TP server 106 to interact with the user device 104. In related examples, a software application on the user device 104 prompts the AH to grant or deny permission for the AP server 102 and/or the TP server 106 to interact with the AH in accordance with the features of the credit line adjustment system 100.

Figure 3:
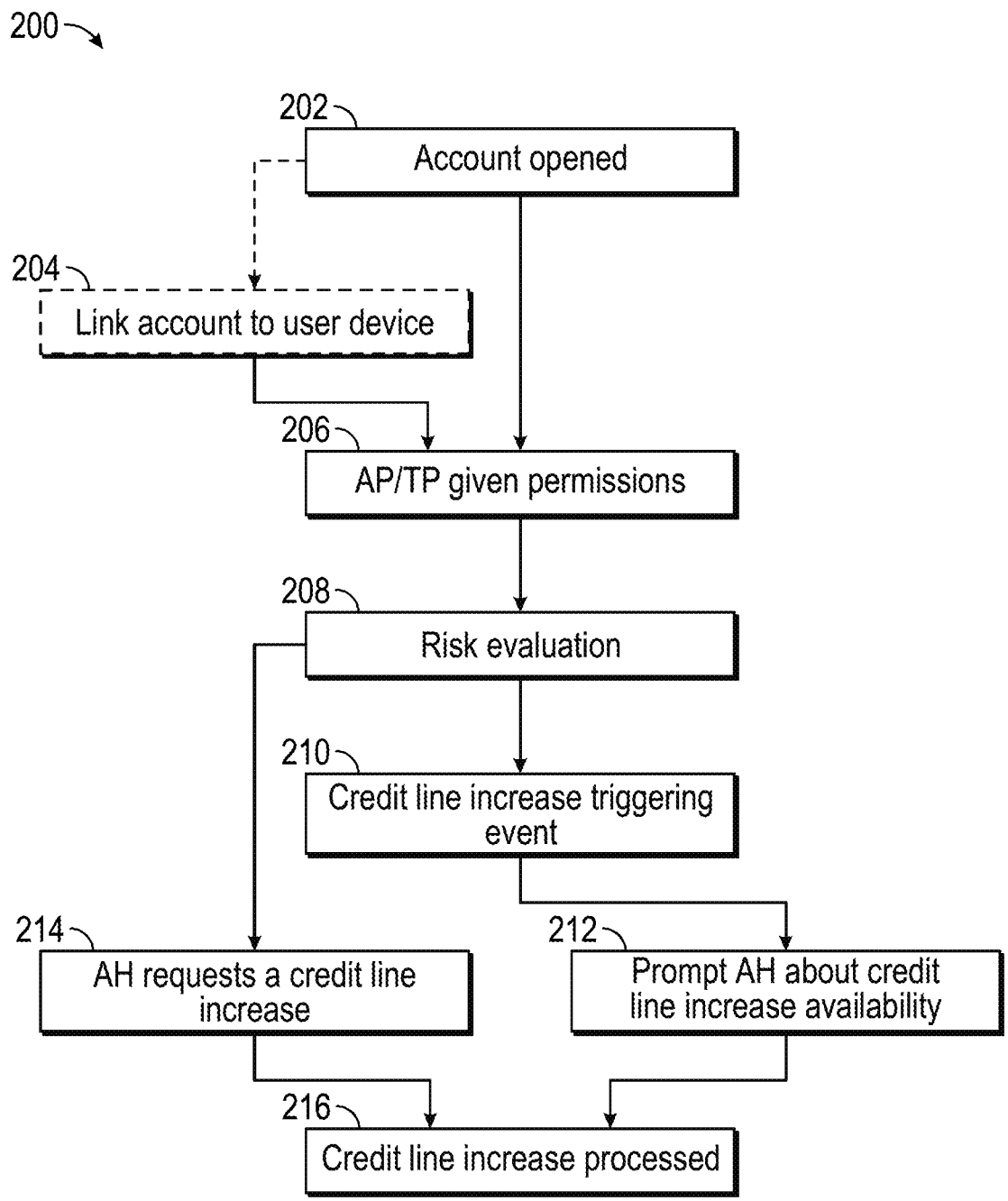
FIG. 3 is a flow diagram illustrating an example of a credit line adjustment process implemented by the system of FIG. 1.

FIG. 3 is a flow diagram illustrating an example of a credit line adjustment process 200 implemented by the system 100 of FIG. 1.

The example process 200 illustrates a credit line increase of a single credit card account of an account holder. In a step 202, a consumer opens a credit card account with an account provider, the consumer thereby becoming an account holder. In opening the account, the consumer provides information about the consumer, such as the name and contact information, income information, credit score, etc. Authentication credentials, e.g., a login name and password, security questions, etc., are established to mitigate the chances of unauthorized access to the credit card account.

The credit card account carries one or more terms and conditions. For example, the credit card account can include an annual fee, a particular APR, a particular minimum payment requirement, and a particular rewards program, e.g., the AH receives points or frequent flier miles based on one or more criteria, such as the number of dollars spent with the credit card and/or the types of goods and services credit card dollars are spent on. In some examples, the AH may also receive a promotional reward, e.g., a certain number of points or miles for signing up for the credit card and/or for spending at least a threshold amount of money with the credit card within a certain time period.

In an optional step 204, the AH downloads and installs a software application on a user device that electronically links the user device to the credit card account, thereby enabling the AH to access the account for various purposes, such as viewing balance, reviewing terms and conditions, paying a bill, etc. For purposes of this example, the user device is a mobile device, such as a smartphone. The software application can also link the mobile device to a server associated with the AP, and/or a server associated with at least one TP, such as a goods merchant.

In a step 206, the AH grants permission to the AP and/or the TP to interact with the AH via the user device in connection with one or more possible purchases and/or a possible credit line increases on the AH's credit card account. The permission can be granted automatically upon the AH's accessing the credit card account, upon opening or logging into the software application, or by responding to a prompt sent by the AP server and/or the TP server requesting the permission.

In a step 208 the AP, via, e.g., a risk evaluating module housed on the AP server, evaluates the AH's credit worthiness/risk of default at a given point in time to determine if the AH is entitled to a credit line increase and, if so, the maximum permissible amount of such an increase, and any terms or conditions that would accompany the increase. The evaluation can take place automatically, e.g., on a predetermined periodic basis, or in response to activity by the AH or the TP. Such activity may include, for example, a promotional offer by the TP for a particular good or service, or the AH's indication of a desire for a credit line increase.

In a step 210, a credit line increase triggering event occurs. The credit line increase triggering event can be, for example, the AH's visiting a particular merchant website, the AH's presence at a physical merchant location, issuance of a promotional offer from a merchant (generally, or specifically directed at the AH), a predetermined elapsed time since the AH last purchased a particular good or service, or any other indication that an AH desires or may desire to make a particular purchase.

In one example of a credit line increase triggering event, a positioning device on the user device of the AH informs the AP server that the AH has entered a particular store. Information transmitted to an AP server database regarding the AH and/or the particular store indicates that a credit line increase for the AH may be appropriate. For example the credit card account may be promoting purchases at the particular store by offering extra rewards points for using the AH's credit card at that store, suggesting that a credit line increase may be desirable to the AH in order to better take advantage of the credit card promotion.

In another example of a credit line increase triggering event, the event can occur at the POS. For example, the AH is prepared to purchase goods or services that exceed the current credit limit balance on the credit card. In some examples, the purchasing event can be relayed to the AP via a near field communication (NFC) from a POS device associated with the merchant. At the POS, e.g., at the register or prior to payment via a mobile payment application on the AH's mobile device having links to the credit card account(s) in question, the AH can use their mobile device to view immediately if a credit line increase is available on the credit card account.

In another example of a credit line increase triggering event, information transmitted to an AP server database indicates that the AH has entered a merchant store that is promoting the purchase of a particular product or is having a sale on one or more product, thereby indicating that a credit line increase may be desirable for the AH in order to better take advantage of the merchant promotion.

In another example, a credit line increase triggering event could be the AH's attempted purchase of a good or service that would exceed the credit limit for that credit card. In that case, the AP system can be configured (e.g., assuming prior approval by the AH for such an increase to be executed) to automatically increase the credit limit of the AH's credit card used for the purchase in order to avoid exceeding the credit limit with the purchase and allow the purchase to go through. The AH can pre-configure their credit card accounts with parameters that dictate the limits (e.g., the maximum permitted amount of increase) for such an automatic increase at the point of purchase of a good or service that would otherwise exceed the credit limit of that credit card.

Likewise, it should be appreciated that the AH can pre-configure their credit card accounts with conditions and parameters for the automatic initiation and completion of one or more credit line allocations and/or one or more credit line increases upon the occurrence of a predetermined credit line adjustment triggering event or events.

In some examples of the credit adjustment system of the present disclosure, in a step 212, in response to a credit line increase triggering event, a credit line increase module on the AP server prompts the AH regarding an available credit line increase. The prompt can include information identifying the AH and the credit card for which the increase is available, and also the maximum available increase and any terms or conditions that would accompany the increase. For example, the prompt can indicate to the AH that a credit line increase of up to $5,000 is available without changing any terms or conditions of the credit card account. The prompt can also indicate to the AH why a credit line increase might be desirable to the AH. For example, the prompt can inform the AH about the occurrence of the credit line increase triggering event. The prompt can also display on the user device selectable options to increase or not to increase the credit line, and a data input field in which the AH can input and then submit the desired amount of credit limit, provided the input amount is no greater than the maximum increase available.

As an alternative to steps 210 and 212, in a step 214 the AH requests, via a credit line increase request module operating on the user device, a credit line increase for a particular credit card associated with the AP. The request is sent to the AP server for processing. This request can take place at any time, i.e., even in the absence of a credit line increase triggering event. The AH's request can specify a requested increase amount or not. If the request does not include a specific increase amount, the AP can inform the AH if an increase is available and, if so, the maximum amount available for the increase. If the AH's request does specify a requested increase amount, the AP can inform the AH if the requested increase amount is available, or if not, the maximum amount of increase that is available. In some examples, because of the evaluation process of step 208, the AP response to the AH's credit line request can be immediate, or approximately immediate. In other examples, the AP's evaluation of the AH's eligibility for a credit line increase is not triggered until the AH requests a credit line increase.

In a step 216, following steps 210 and 212, or step 214, the AP server processes the credit line increase and makes the increase available to the AH for spending purposes.

Figure 4:
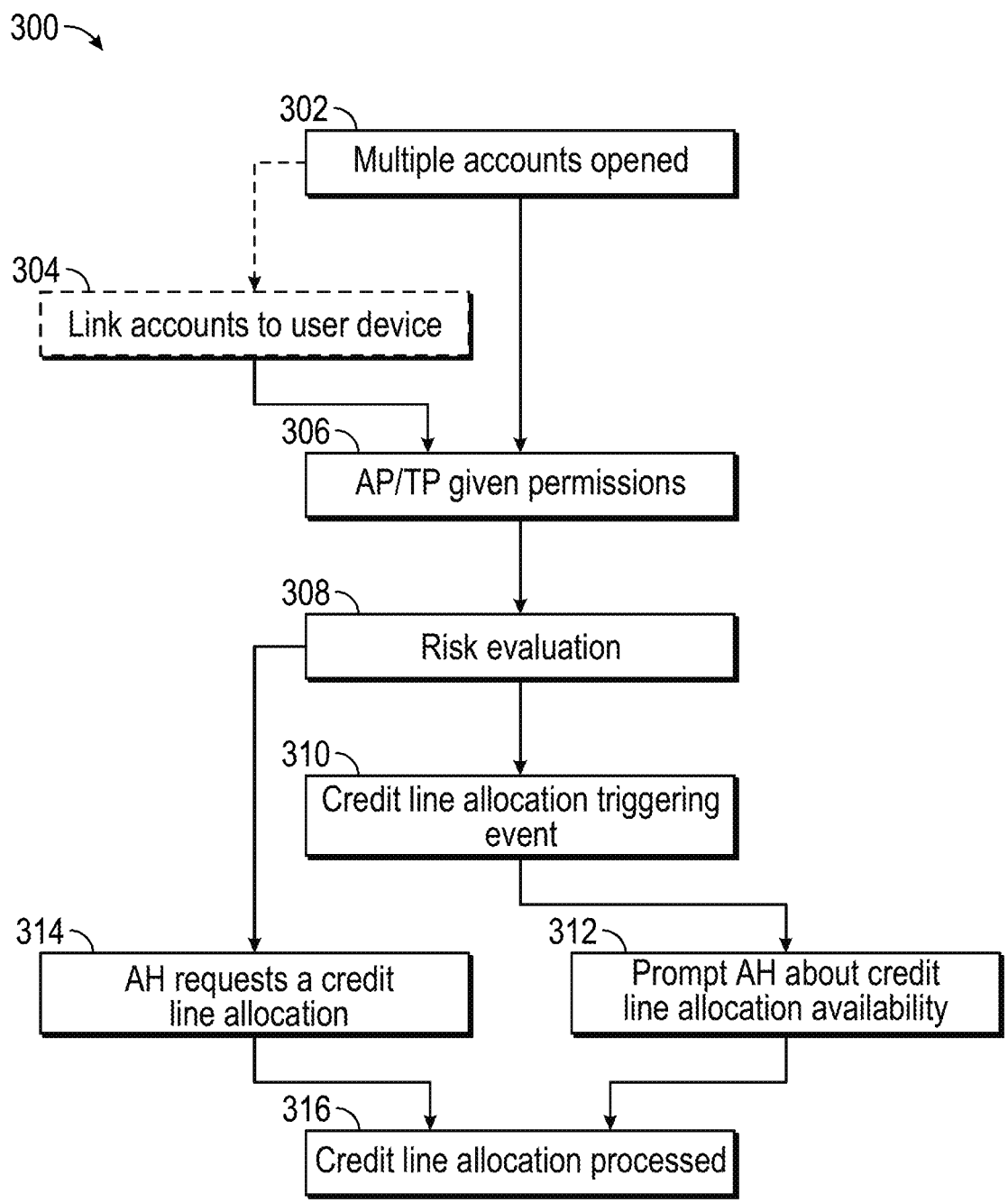
FIG. 4 is a flow diagram illustrating a further example of a credit line adjustment process implemented by the system of FIG. 1.

FIG. 4 is a flow diagram illustrating a further example of a credit line adjustment process 300 implemented by the system 100 of FIG. 1.

The example process 300 illustrates a credit line allocation from a first credit card to a second credit card of an account holder. It should be appreciated that the principles of this allocation can be applied to allocations amongst more than two credit cards, e.g., three, four or more credit cards.

In a step 302, a consumer opens at least first and second credit card accounts with an account provider, the consumer thereby becoming an account holder. The accounts need not be opened at the same time. In some examples, the two accounts are opened days, weeks, months, or years apart. In opening the accounts, the consumer provides information about the consumer, such as the name and contact information, income information, credit score, etc. Authentication credentials, e.g., a login name and password, security questions, etc., are established to mitigate the chances of unauthorized access to the credit card accounts.

Each of the credit card accounts carries one or more terms and conditions, and terms and conditions may differ as between the two accounts. For example, each credit card account can include its own annual fee, APR, minimum payment requirement, and a particular rewards program, e.g., the AH receives points or frequent flier miles based on one or more criteria, such as the number of dollars spent with the credit card and/or the types of goods and services credit card dollars are spent on. In some examples, the AH may also receive a promotional reward, e.g., a certain number of points or miles for signing up for the credit card and/or for spending at least a threshold amount of money with the credit card within a certain period of time from opening of the account. Thus, it should be appreciated that the AH's use of one versus the other of the credit cards can be advantageous to the AH for any of a number of reasons. One such reason could be to take advantage of a promotional reward available on the more recently opened credit card.

In an optional step 304, the AH downloads and installs a software application on a user device that electronically links the user device to the credit card accounts, thereby enabling the AH to access the accounts for various purposes, such as viewing balance, reviewing terms and conditions, paying a bill, etc. For purposes of this example, the user device is a mobile device, such as a smartphone. The software application can also link the mobile device to a server associated with the AP, and/or a server associated with at least one TP, such as a goods merchant.

In a step 306, the AH grants permission to the AP and/or the TP to interact with the AH via the user device in connection with one or more possible purchases and/or one or more possible credit line allocations on the AH's credit card accounts. The permission can be granted automatically upon the AH's accessing the credit card account(s), upon opening or logging into the software application, or by responding to a prompt sent by the AP server and/or the TP server requesting the permission.

In a step 308 the AP, e.g., via a risk evaluating module housed on the AP server, evaluates the AH's credit worthiness/risk of default, and the terms and conditions of the AH's credit card accounts at a given point in time to determine if the AH is entitled to a credit line allocation between the cards and, if so, the maximum permissible amount of such an allocation, the direction of the allocation (i.e., which card is being allocated from and which card is being allocated to) and any terms or conditions that would accompany the allocation.

For example, if credit is allocated from a first credit card to a second credit card, the allocated credit may carry the second credit card's APR and rewards terms, even if the first credit card's APR is higher and/or the first credit card's rewards terms are less favorable to the AH. The dollar allocation from one credit card account to another can be 1:1 (i.e., one dollar in the transferee account is added for each dollar transferred out of the transferor account), or some other ratio. The evaluation can take place automatically, e.g., on a periodic basis, or in response to activity by the AH or the TP. Such activity may include, for example, a promotional offer by the TP for a particular good or service, or the AH's indication of a desire for a credit line allocation.

In a step 310, a credit line allocation triggering event occurs. The credit line allocation triggering event can be, for example, the AH's visiting a particular merchant website, the AH's presence at a physical merchant location, issuance of a promotional offer from a merchant (generally, or specifically directed at the AH), a predetermined elapsed time since the AH last purchased a particular good or service, or any other indication that a AH desires or may desire to make a particular purchase. For example, a credit line allocation triggering event could be the AH's attempted purchase of a good or service that would exceed the credit limit for that credit card. In that case, the AP system can be configured (e.g., assuming prior approval by the AH for such an allocation to be executed) to automatically allocate sufficient credit from another of the AH's credit card accounts in order to avoid exceeding the credit limit with the purchase and allow the purchase to go through.

The AH can pre-configure their credit card accounts with parameters that dictate the limits (e.g., the maximum permitted amount of allocation) for such an automatic allocation at the point of purchase of a good or service that would otherwise exceed the credit limit of that credit card.

In another example, a credit line allocation triggering event could be simply the AH's opening of a new credit card account having one or more terms or conditions that are more advantageous to the consumer than a previously opened credit card account.

In another example of a credit line allocation triggering event, a positioning device on the user device of the AH informs the AP server that the AH has entered a particular store. Information transmitted to an AP server database regarding the AH and/or the particular store indicates that a credit line allocation for the AH may be appropriate. For example, one of the AH's credit card accounts may be promoting purchases at the particular store by offering extra rewards points for using that particular credit card at that store, suggesting that a credit line allocation to the promoted credit card may be desirable to the AH in order to better take advantage of the promotion.

In another example of a credit line allocation triggering event, the event can occur at the POS. For example, the AH is prepared to purchase goods or services that exceed the current credit limit balance on each of the AH's credit cards. In some examples, the purchasing event can be relayed to the AP via a NFC from a POS device associated with the merchant. Rather than split the payment between the credit cards, at the POS, e.g., at the register, the AH can use their mobile device to view immediately if a credit line allocation is available between the AH's credit card accounts.

In another example of a credit line allocation triggering event, information transmitted to an AP server database indicates that the AH has entered a merchant store that is promoting the purchase of a particular product or is having a sale on one or more products, thereby indicating that a credit line allocation may be desirable for the AH in order to better take advantage of the merchant promotion.

In some examples of the credit adjustment system of the present disclosure, in a step 312, in response to a credit line allocation triggering event, a credit line allocation module on the AP server prompts the AH regarding an available credit line allocation. The prompt can include information identifying the AH and the credit cards between which the allocation is available, and also the maximum available allocation and any terms or conditions that would accompany the allocation. For example, the prompt can indicate to the AH that a credit line allocation of up to $5,000 is available from Credit Card A to Credit Card B, such that the allocated line will adopt the terms and conditions of Credit Card B. The prompt can also indicate to the AH why a credit line allocation might be desirable to the AH. For example, the prompt can inform the AH about the occurrence of the credit line allocation triggering event. The prompt can also display on the user device selectable options to allocate or not to allocate the credit line, and a data input field in which the AH can input and then submit the desired amount of credit line allocation, provided the input amount is no greater than the maximum allocation available.

As an alternative to steps 310 and 312, in a step 314 the AH requests, via a credit line allocation request module operating on the user device, a credit line increase for a particular credit card associated with the AP. The request is sent to the AP server for processing. This request can take place at any time, i.e., even in the absence of a credit line allocation triggering event. The AH's request can specify a requested allocation amount or not. If the request does not include a specific allocation amount, the AP can inform the AH if an allocation is available and, if so, the maximum amount available for the allocation. If the AH's request does specify a requested allocation amount, the AP can inform the AH if the allocation increase amount is available, or if not, the maximum amount of allocation that is available. In some examples, because of the evaluation process of step 308, the AP response to the AH's credit line allocation request can be immediate, or approximately immediate. In other examples, the AP's evaluation of the AH's eligibility for a credit allocation increase is not triggered until the AH requests a credit line increase.

In a step 316, following steps 310 and 312, or step 314, the AP server processes the credit line allocation and allocates credit from one credit card account to another credit card account.

It should be appreciated that, in addition to credit card accounts, features of the credit line adjustment system disclosed herein may be applied to other forms of financial and monetary accounts and credit lines, not just credit cards. It should also be appreciated that the credit line allocation features of the disclosed credit line adjustment system can be applied to more than two credit cards. For example an allocation could be processed from one credit card to two or more credit cards, or from two or more credit cards to one or more credit cards. In addition, the two or more credit cards can be provided by the same account provider, or by two or more account providers.

In addition, the same credit line adjustment system can execute the processes 200 and 300 in tandem, enabling account holders to perform a credit line increase and a credit line allocation at the same time. For example, the credit adjustment system can enable an account holder to increase the credit line on a Credit Card B, and at the same time allocate additional credit line from Credit Card A to Credit Card B. In this example, the steps 208 and 308 can be performed together by the risk evaluation module housed on the AP server, the risk evaluation module determining the maximum amount of available adjustment, which can include a maximum credit line increase available, a maximum credit line allocation available, and a maximum combination of a credit line increase and a credit line adjustment. In some examples the combination of the credit line increase and credit line allocation can be less than or more than the sum of the individual credit line increase and credit line allocation maxima.

It should also be appreciated that an AH may perform a credit line allocation and/or a credit line increase and still make a purchase that is split between two or more credit cards.

FIGS. 5A-5E are example user interface displays showing user input screens. These user interface displays can be displayed to the user on the user device in conjunction with the processes 200 and 300 described above. In some examples, these displays are generated when the processes (200, 300) utilize the steps 210 and 212, and 310 and 312, respectively, rather than the steps 214 and 314, respectively. In other words, the user interface display of FIGS. 5A-5E can be implemented following the occurrence of a credit line adjustment triggering event (i.e., a credit line increase triggering event or a credit line allocation triggering event) as described above. In other examples, one or more of these displays are generated when the steps 214 and/or 314 occur, e.g., after an affirmative request from an AH for a credit line adjustment.

In FIG. 5A a notification 400 informs the account holder that they are eligible for an increased credit limit on a Credit Card A and that the AH can take advantage of the increased credit limit using a combination of a credit line increase and a credit line reallocation. The credit card account selected by the AP for the notification 400 can be tailored to a particular credit line adjustment triggering event. In some examples, the card suggested to the AH for credit limit increase is one that was more recently opened and therefore carries promotional benefits; however, any benefit provided by one credit card account over another credit card account can be the basis for the AP system to suggest or default to a credit limit increase for that particular credit card.

In another example, a suggested credit line allocation can be made by the AP based on the determination that the AH has two available credit card accounts and that an offer relevant to a particular purchase or anticipated purchase is associated with a first credit card, but that the amount of available credit on the first card is insufficient to fund the purchase. In addition, the AP server determines that there is sufficient credit available for the second credit card, but that the cost of a purchase or anticipated purchase will be higher without the offer associated with the first credit card. The AP server then suggests to the AH a credit line allocation from the second credit card to the first credit card sufficient to fund the purchase at the lowest possible purchase price.

A notification 402 informs the AH as to the current credit limit on the Credit Card A. In area 404, the AH is provided with selectable options to increase the credit line amount or allocate credit line from Credit Card B to Credit Card A. For each of the increase and the allocation, the AH can either select the maximum increase/allocation permitted (the interface indicates the available maximum) or input a lesser amount in the field (406, 408). The lesser amount can be submitted by selecting the button (410, 412). In a dynamic notification line 414, the credit line on Credit Card A based on the AH's selections is indicated. In an area 416, the AH is provided with selectable options to submit the credit line adjustment, edit the credit line adjustment, or cancel the credit line adjustment.

In FIG. 5B, the AH is selecting a credit line increase amount that is less than the maximum available, and is selecting the maximum available credit line allocation.

In FIG. 5C, the AH is selecting the maximum available credit line increase, and less than the maximum available credit line allocation.

In FIG. 5D, the AH is permitted only a credit line increase, and the AH is selecting the maximum available increase.

In FIG. 5E, the AH is selecting the maximum available credit line allocation, and less than the maximum available credit line increase.

FIGS. 6A-6H are further example user interface displays showing user input screens. These user interface displays can be displayed to the user on the user device in conjunction with the processes 200 and 300 described above. In some examples, these displays are generated when the processes (200, 300) utilize the steps 210 and 212, and 310 and 312, respectively, rather than the steps 214 and 314, respectively. In other words, the user interface display of FIGS. 6A-6H can be implemented following the occurrence of a credit line adjustment triggering event (i.e., a credit line increase triggering event or a credit line allocation triggering event) as described above. In other examples, one or more of these displays are generated when the steps 214 and/or 314 occur, e.g., after an affirmative request from an AH for a credit line adjustment.

Figure 6A:
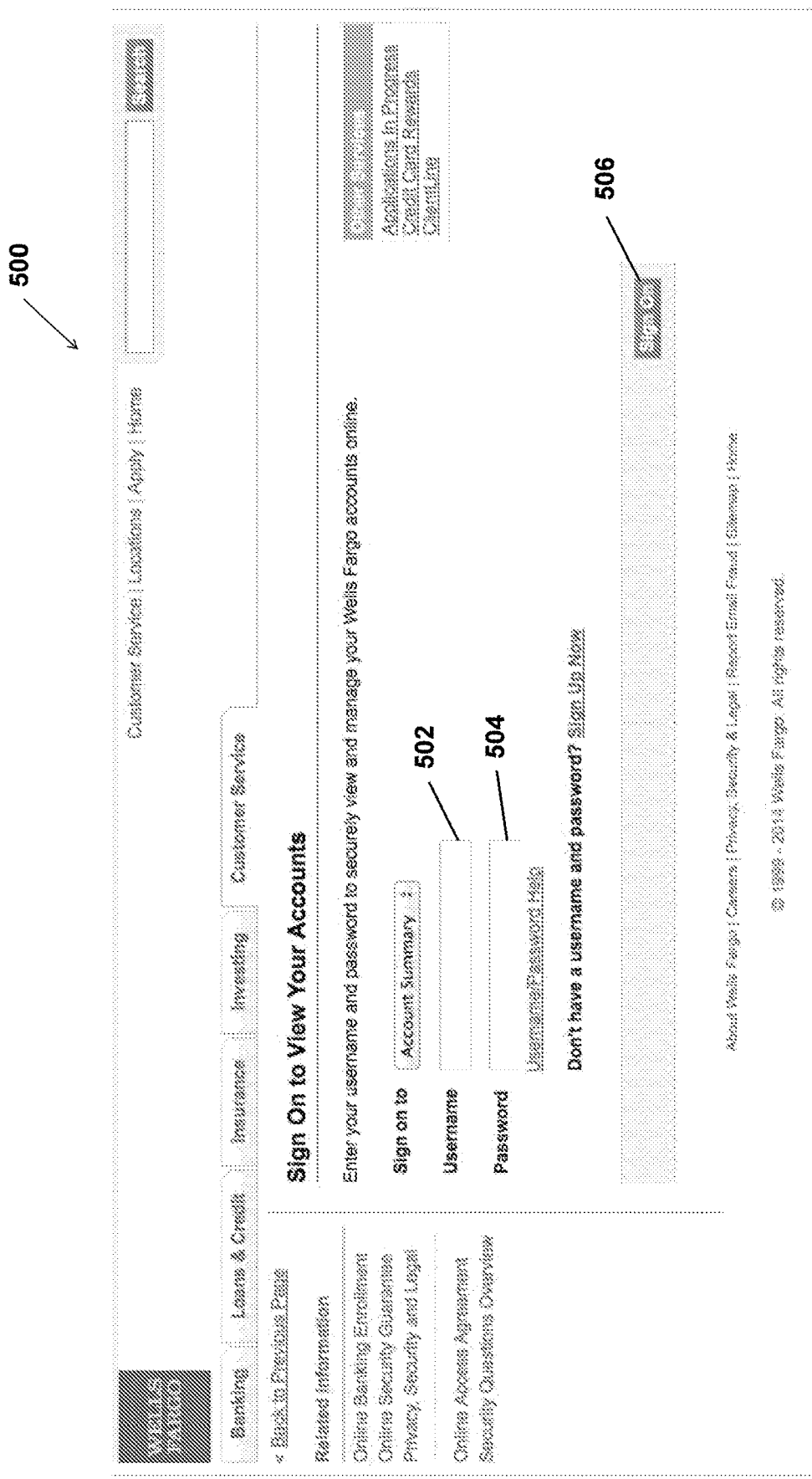
FIG. 6A is another example user interface display showing a user input screen.

FIG. 6A is an example of a user interface display showing an example login page 500. The login page 500 includes a username field 502, a password field 504, and a selectable submission button 506 to enable the AH to authenticate themselves and then access their credit card accounts and the credit line adjustment system of the present disclosure.

Figure 6B:
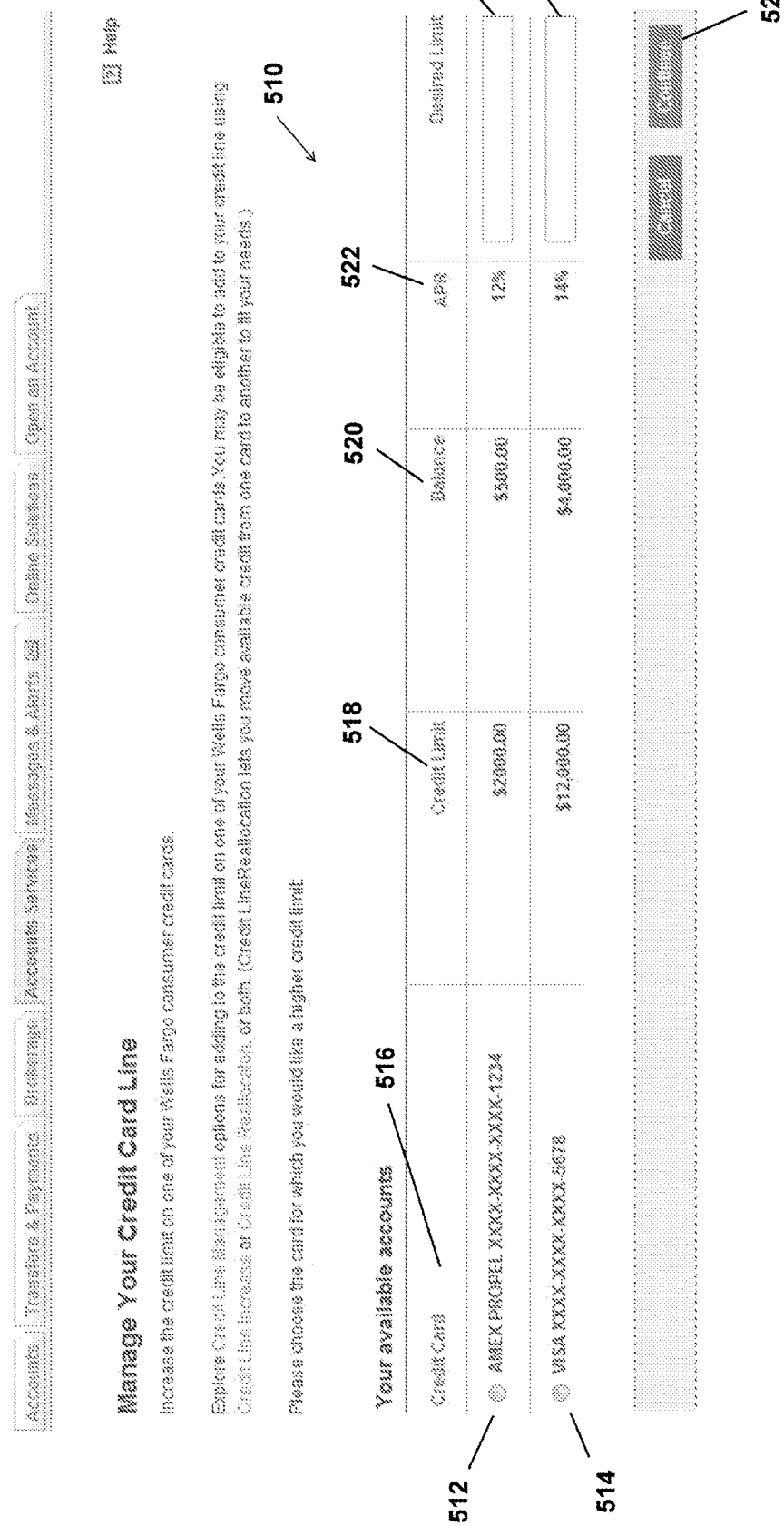
FIG. 6B is another example user interface display showing a user input screen.

FIG. 6B is an example of a user interface display showing an example initial credit line adjustment request page 508. The initial credit line adjustment request page 508 includes an area 510 that lists the AH's available credit card accounts (512, 514). For each of the credit card accounts (512, 514), the credit card is identified by the credit card name and at least some digits of the credit card number 516, the current credit limit 518, the balance 520, and the APR 522. The credit card accounts are selectable by the AH. In this example, just one of the credit cards is selectable for an increase in the credit limit. The AH selects the credit card desired for a credit limit increase and inputs the desired credit limit for that card in the appropriate field (524, 526), which can be submitted using the button 528.

In some examples, the AP system can intelligently order the credit card accounts on the page 508. For example, the first listed credit card account can be one that was more recently opened and therefore carries promotional benefits; however, any benefit provided by one credit card account over another credit card account can be the basis for the AP system's ordering of the credit card accounts on the page 508.

Figure 6C:
FIG. 6C is another example user interface display showing a user input screen.

FIG. 6C is an example of a user interface display showing a credit line adjustment method page 530. The credit line adjustment method page 530 allows the AH to select an option for how to increase the credit limit on the desired credit card account. In this example, the AH can select from a first option 532 to increase the line of credit only, a second option 534 to perform a credit line allocation from another credit card, and a third option 536 to perform a combination of a credit line increase and a credit line allocation. The selected option can be submitted using the button 538.

If the AH selects a credit line allocation, the AH can be directed to a credit line allocation interface. An example of a credit line allocation interface page 540 is shown in FIG. 6D. The credit line allocation interface page 540 includes an area 542 that shows the credit card accounts from which credit lines can be allocated. Each such credit card account is identified by the credit card name and at least some digits of the credit card number 544, the credit limit 546, the balance 548, and the APR 550. The AH's selection of the credit card account from which to allocate credit line can be submitted using the button 552. Once this selection has been submitted (or at any time during the credit line adjustment process) the AH can be required to reconfirm their identity before continuing.

Figure 6E:
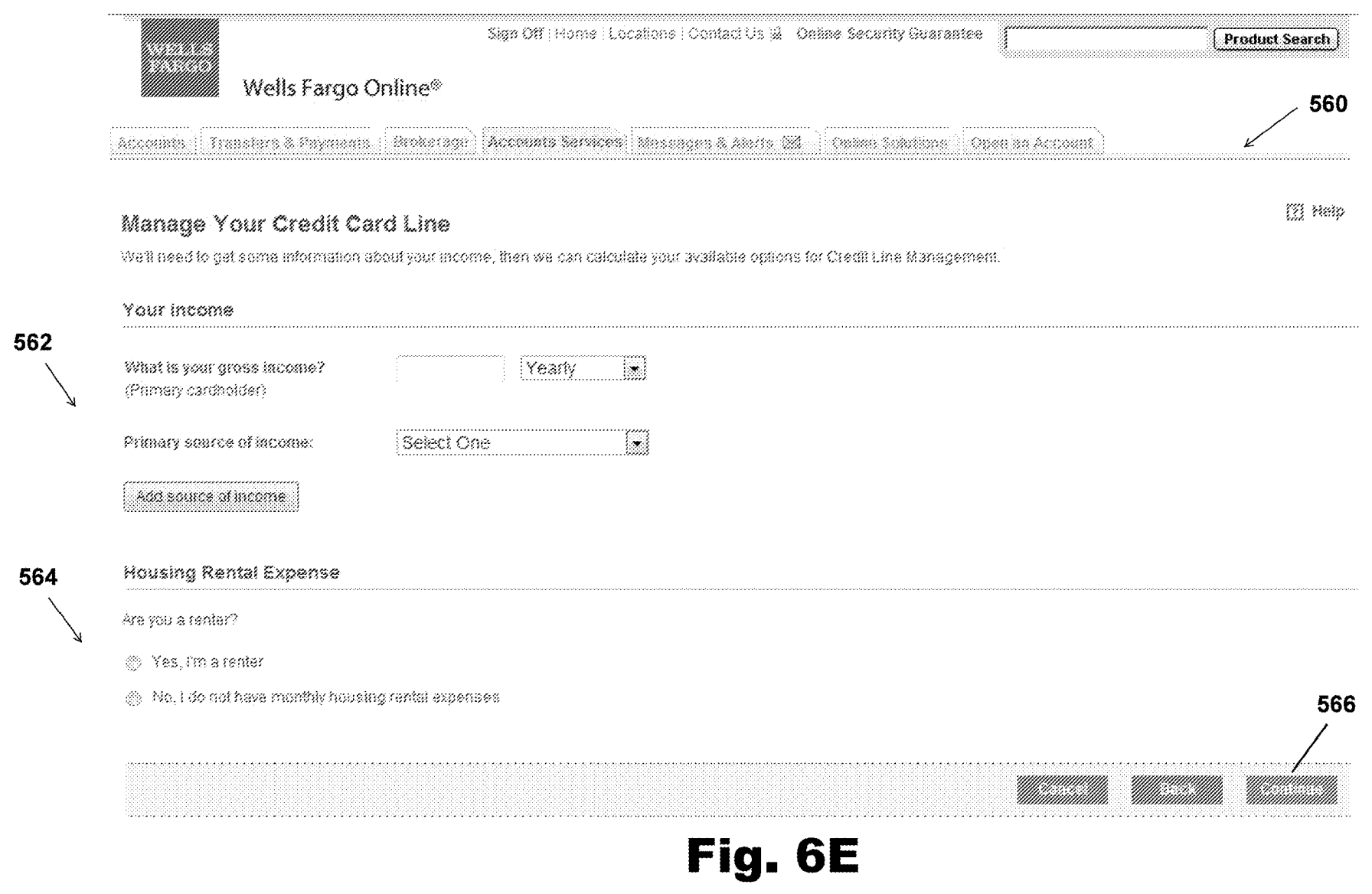

FIG. 6E is an example risk evaluation interface page 560, through which the AH can submit information relevant to the AP's determination regarding whether the AH is eligible for a credit line adjustment and, if so, the parameters of such an adjustment. In this example, the risk evaluation interface page 560 includes a first area 562, in which the AH can submit information regarding their income (e.g., the amount of gross income, the source of income, etc.) and a second area 564, in which the AH can submit information about their housing (e.g., whether they rent a house). It should be appreciated that other types of information may be requested by the AP at this stage to determine the AH's eligibility for a credit line adjustment. The information entered in areas 562 and 564 can be submitted using the button 566.

Figure 6F:
FIG. 6F is another example user interface display showing a user input screen.

FIG. 6F is an example summary interface page 570 that summarizes the credit card account to which a credit limit increase is desired, the credit card account selected from which to transfer credit line, and the risk information provided by the AH. The page 570 enables the AH to edit the information contained therein.

Figure 6G:
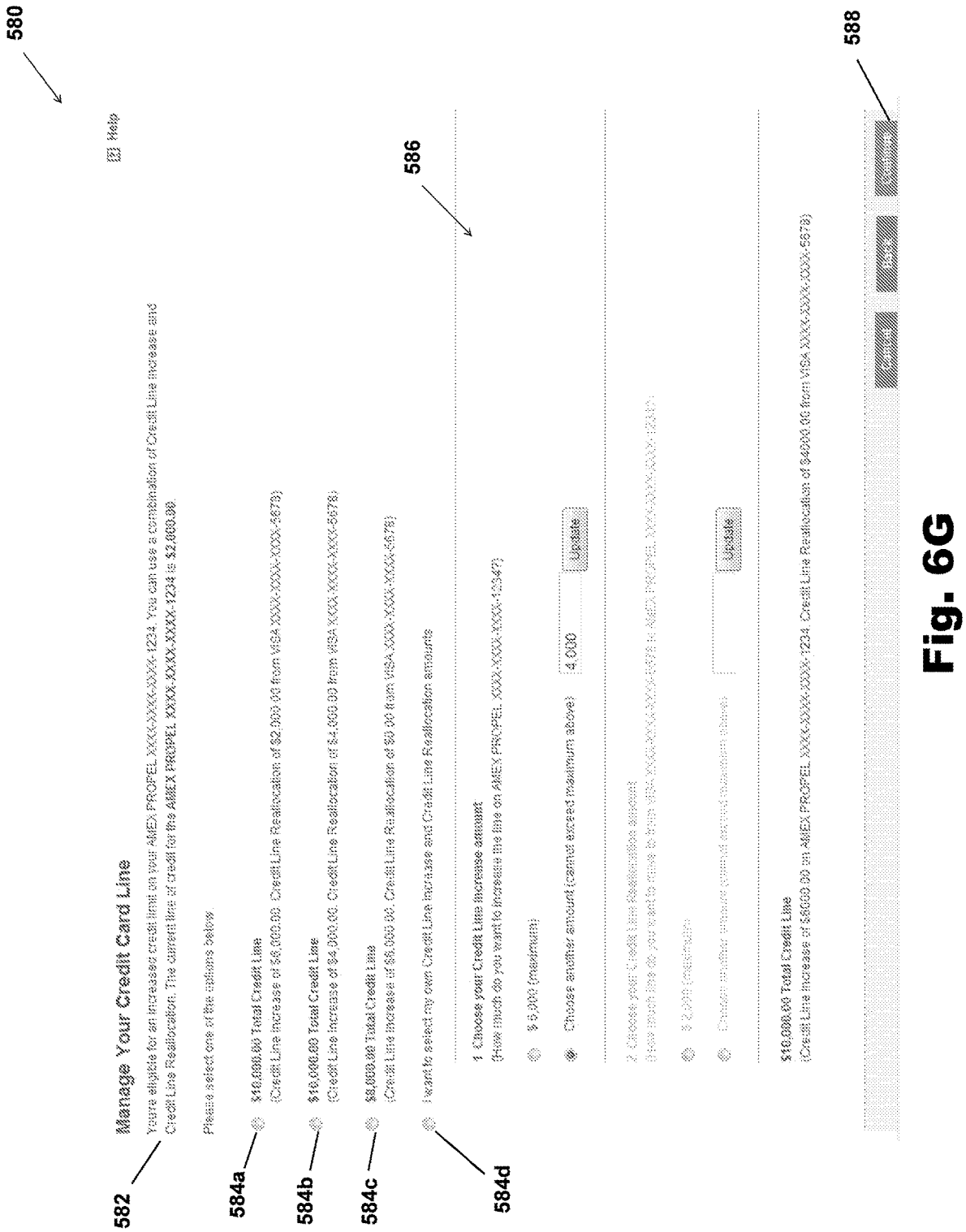
FIG. 6G is another example user interface display showing a user input screen.

FIG. 6G is an example credit line adjustment activation page 580 displayable once the AP has evaluated the AH's risk level and determined any credit line adjustment(s) available to the AH. In this example, a notification 582 informs the AH that they are eligible for an increased credit limit on the card the AH had selected for increase, and also informs the AH how the credit limit can be increased. In this example, the credit limit can be increased with a credit line increase, a credit line allocation, or a combination thereof. The AH is shown specific options (584a, 584b, 584c, 584d) for credit limit increases. Each option indicates the total amount of credit limit and how that credit limit would be achieved (i.e., the quantified combination of credit line increase and/or credit line allocation). The quantified options 584a, 584b, and 584c are set by the AP. The option 584d allows the AH to select their own combination of credit line increase and/or credit line allocation. In conjunction with the option 584d, in the area 586 of the page the AH can either select the maximum increase/allocation permitted (the interface indicates what the maximum available is) or input a lesser amount in the input field provided for each of the line increase and line allocation options. The AH can submit their selections using the button 588.

Figure 6H:
FIG. 6H is another example user interface display showing a user input screen.

FIG. 6H is an example transaction confirmation and summary page 590 displayable once the AH has submitted specific parameters desired for a credit line adjustment. The page 590 includes a notification 592 informing the AH about the new credit line on the credit card account that has received a credit limit increase, identify the card in question and the new line of credit amount. The page 590 also includes a notification 594 informing the AH of the amount of the increase, as well as information 596 identifying any credit card from which a credit line allocation was taken, including the new credit limit for the transferor credit card account as a result of the allocation.

In this example, as shown in FIG. 6H, an allocation of $2,000 was made from a credit card with a 14% APR to a credit card with a 12% APR. The allocation was a 1:1 allocation, increasing the transferee credit card account credit limit by $2,000 and decreasing the transferor credit card account credit limit by $2,000. The credit line adjustment in this example also includes a credit line increase of $6,000 on the transferee credit card account. In some examples, display of the transaction confirmation and summary page 590 indicates that the credit line adjustment has been processed by the AP and is ready to be used by the AH. In other examples, the AH can receive a follow-up communication, e.g, in the form of a text message, voice message, or an email, informing the AH that the credit line adjustment has been processed and is ready to be used.

Figure 7A:
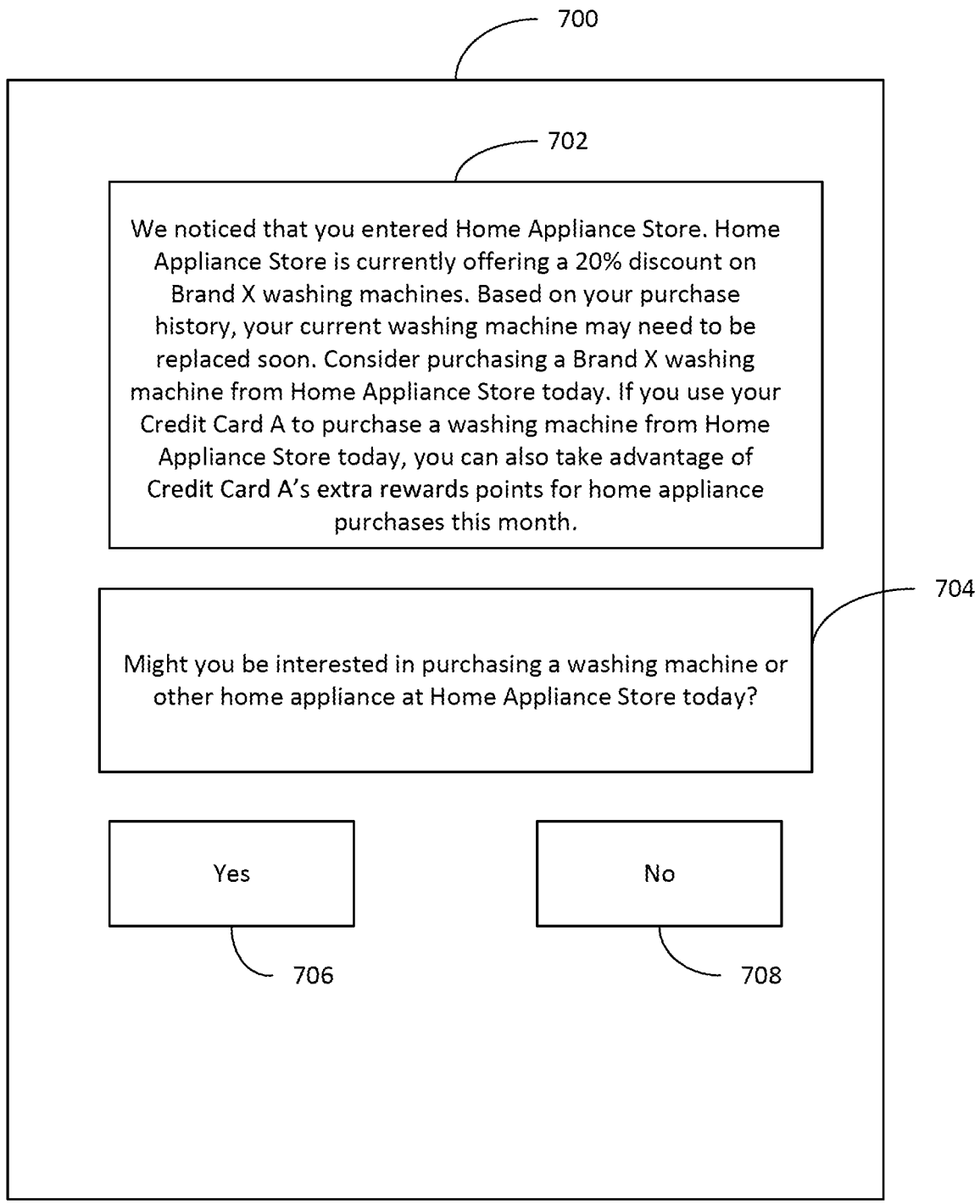
FIG. 7A is a schematic example user interface display on a mobile communication device.

FIG. 7A illustrates a schematic user interface display 700 that an AH may encounter on their mobile communication device (e.g., a smart phone, cell phone, or tablet) after physically entering a merchant's store with their mobile communication device, the mobile communication device being a part of, or connected to, a credit line adjustment system. The user interface screen 700 may be displayed automatically, without any input from the AH, or alternatively in response to input from the AH (e.g., submission by the AH of a request to be provided with information from a credit line adjustment system). In this example, a credit line adjustment system is initiated upon the AH's entering the merchant's store (e.g., via a positioning device, such as GPS, that recognizes the location of the AH's mobile communication device inside the merchant's store). In this particular example, the AH has entered a home appliance store.

The example user interface screen 700 includes an indication 702 of one or more credit adjustment triggering events. The indication 702 can be textual and/or graphical. In this example, there are four credit adjustment triggering events that are indicated to the AH via the indication 702, including: 1) the AH's presence in Home Appliance Store; 2) a promotional offer by Home Appliance Store; 3) a promotional offer by an AP of the AH's Credit Card A; and 4) the elapsing of a predetermined period of time since the AH last purchased a particular type of appliance (e.g., a washing machine) sold by Home Appliance Store. In alternative examples, more or fewer triggering events could be indicated, and the triggering events can be more or less tailored to specific purchasing activities at the merchant store. Alternatively, no triggering events could be indicated. The promotional offer by the Home Appliance Store can be product specific, e.g., only applicable to a particular type of appliance, and/or a particular make, model or brand of appliance. It should be appreciated that, in some examples, the user interface screen 700 may only be generated by the credit line adjustment system if the credit line adjustment system determines that one or more of the triggering events could potentially warrant a credit line adjustment as a result of the AH's entering the merchant store.

The example user interface screen 700 also includes a prompt 704. The prompt 704 can be textual and/or graphical. The prompt 704 asks the AH if they are interested in making a purchase recommended in the indication 702. In this example, the user is provided with selectable options 706 and 708 (e.g., "Yes" and "No" buttons), to indicate to the credit line adjustment system whether they may be interested in such a purchase.

Figure 7B:
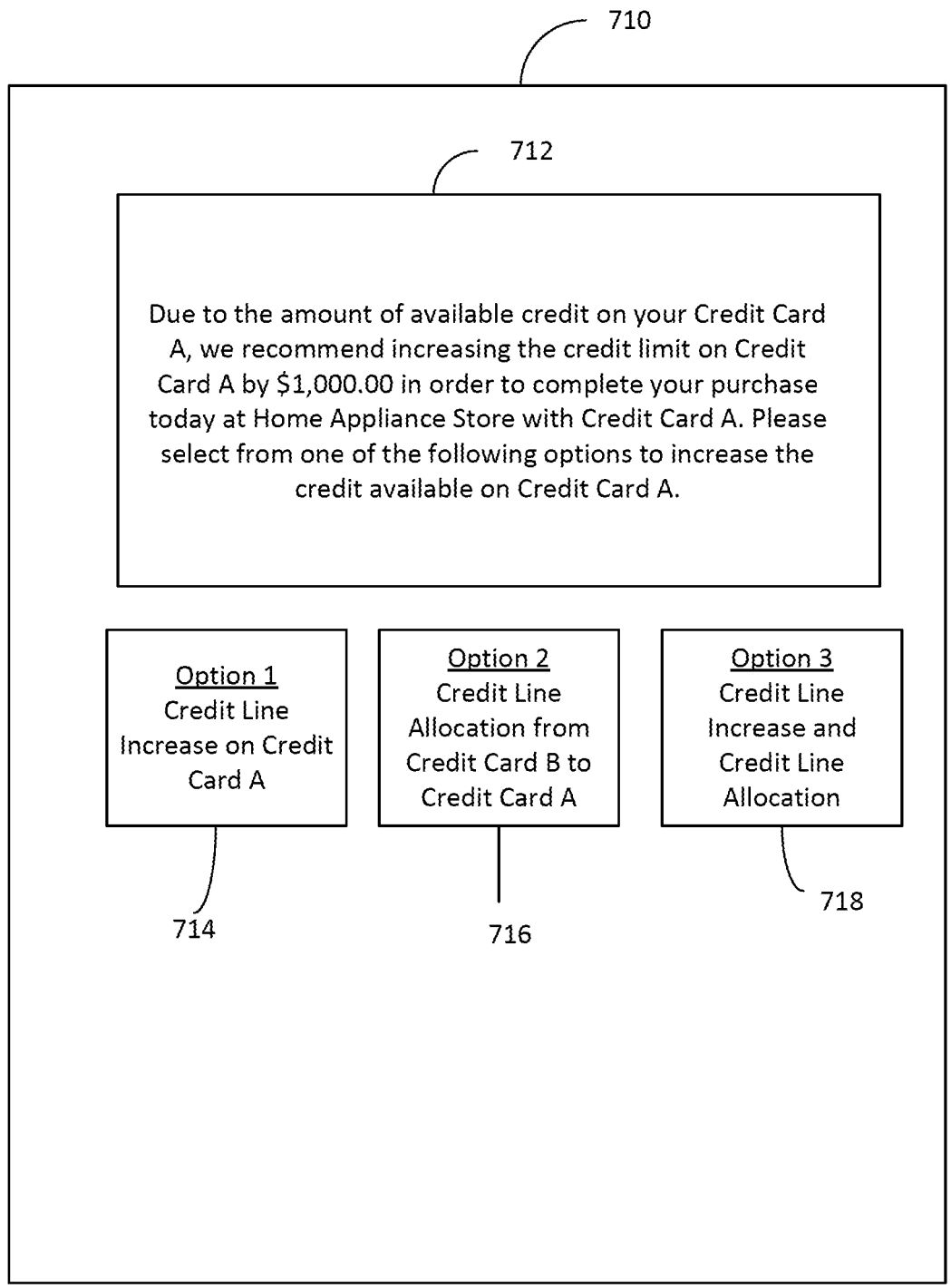
FIG. 7B is another schematic example user interface display on a mobile communication device.

If the AH indicates that they are or may be interested in such a purchase by selecting the appropriate option (e.g., by selecting the "Yes" button), a user interface, such as the schematic example user interface display 710 shown in FIG. 7B, may be displayed on the AH's mobile communication device. The user interface 710 includes a credit line adjustment indicator 712, which may be textual and/or graphical. In this example, the credit line adjustment indicator 712 informs the AH that an increase in the credit limit on Credit Card A is recommended in order to make the recommended purchase. The recommended increase in credit limit may be appropriate because of the price of a specific recommended product for purchase (e.g., the price of a specific make and model of washing machine, such as the one on sale at Home Appliance Store), and/or because the available credit on Credit Card A is, generally speaking, relatively low. In some examples, such as the one shown, the credit line adjustment indicator 712 can inform the AH why the adjustment is recommended. In the example shown in FIG. 7B, the credit line adjustment indicator 712 also informs the AH that there are one or more selectable options for performing the credit limit increase. The credit line adjustment indicator can also recommend a specific amount, minimum amount, maximum amount, and/or range of amounts of credit limit increase on Credit Card A. In this example, the credit line adjustment indicator 712 recommends the specific amount of a $1,000.00 increase in the credit limit on Credit Card A.

In this example, the selectable options 714, 716, and 718 for increasing the credit limit on Credit Card A are also displayed on the user interface 710. In this example, the selectable option 714 provides the AH with a credit line increase on Credit Card A; the selectable option 716 provides the AH with an allocation of credit from a Credit Card B to the Credit Card A; and the selectable option 718 provides the AH with a combination of a credit line increase on Credit Card A and a credit line allocation from Credit Card B to Credit Card A. It should be appreciated that fewer or more options may be presented to the AH, consistent with the disclosures herein.

Once the AH has selected a credit line adjustment option from the user interface 710, one or more further user interfaces, consistent with the disclosures herein, can be displayed on the AH's mobile communication device that enable the AH to execute the AH's desired credit line adjustment within parameters (e.g., credit increase maxima) determined by the credit line adjustment system and that inform the AH of relevant terms and conditions associated with the credit line adjustment.

Figure 8:
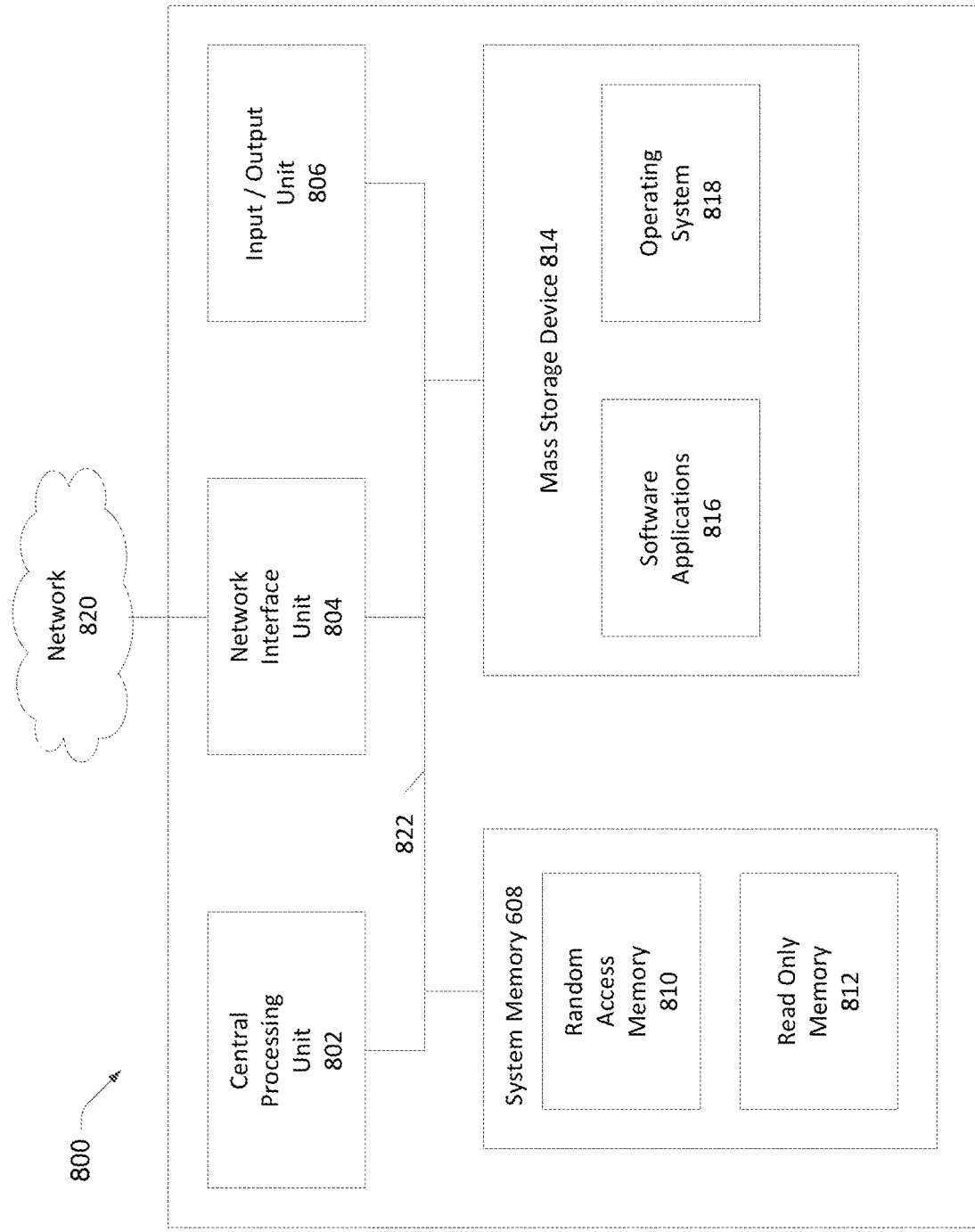
FIG. 8 is a block diagram illustrating portions of an example computer system of the credit line adjustment system of FIG. 1.

FIG. 8 schematically illustrates an example computer system suitable for implementing aspects of the system 100 illustrated in FIG. 1, such as the AP server 102, the TP server 106, and/or the user device 104. The modules, databases, and other components of these servers and devices could all be implemented on a common computer system, or the various components could be implemented on one or more separate computer systems that are accessible by one another. The computer 800, which may be a server computer, for example, includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the server computer 800, such as during startup, is stored in the ROM 812. The computer 800 further includes a mass storage device 814. The mass storage device 814 is able to store software instructions and data. One or more of the databases (110, 118) could be implemented by the mass storage device 814, or one or more of the databases could be implemented by other computer systems accessible by the computer 800.

The mass storage device 814 is connected to the CPU 802 through a mass storage controller (not shown) connected to the system bus 822. The mass storage device 814 and its associated computer-readable data storage media provide non-volatile, non-transitory storage for the server computer 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 800.

According to various embodiments, the server computer 800 may operate in a networked environment using logical connections to remote network devices (such as the others of the AP server 102, the user device 104, and the TP server 106) through the network 820, such as a wireless network, the Internet, or another type of network. The server computer 800 may connect to the network 820 through a network interface unit 804 connected to the system bus 822. It should be appreciated that the network interface unit 804 may also be utilized to connect to other types of networks and remote computing systems. The server computer 800 also includes an input/output controller 806 for receiving and processing input from a number of other devices, including the user interface 116 generated on the user device 104, which could include a touch user interface display screen, or another type of input device. Similarly, the input/output controller 806 may provide output to a touch user interface display screen or other type of output device.

As mentioned briefly above, the mass storage device 814 and the RAM 810 of the server computer 800 can store software instructions and data. The software instructions include an operating system 818 suitable for controlling the operation of the server computer 800. The mass storage device 814 and/or the RAM 810 also store software instructions, that when executed by the CPU 802, cause the server computer 800 to provide the functionality of the server computer 800 discussed in this document. For example, when the server computer 800 corresponds to the AP server 102, the mass storage device 814 and/or the RAM 810 can store software instructions that, when executed by the CPU 802, cause the server computer 800 to implement the credit line increase module 112, the credit line allocation module 114 shown in FIG. 1, and any other modules incorporated to perform the various functionalities described.

Figure 9:
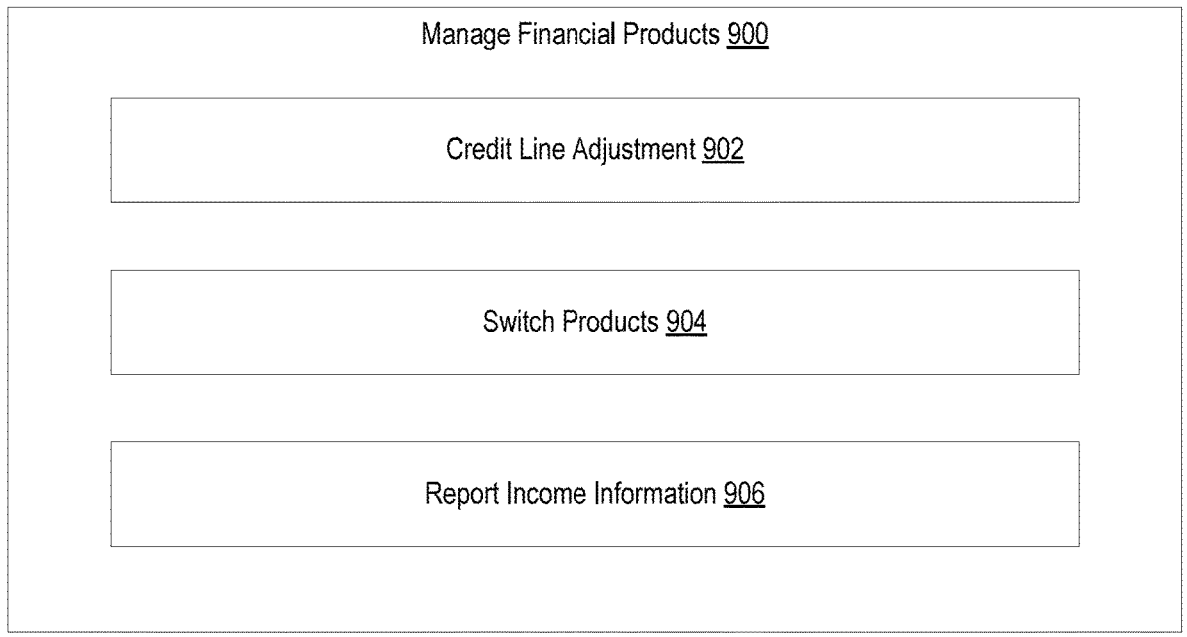
FIG. 9 is an example user interface display illustrating a user input screen to manage financial products.

FIG. 9 is an example user interface 900 for managing financial products. The user interface 900 can be implemented on system 100 of FIG. 1 and displayed to a user on the user device 104 in conjunction with the previous processes 200 and 300 described above and process 1000 described below.

For example, the user interface 900 of FIG. 9 allows the users to manage the financial products associated with the user. These financial products may include credit cards, debit cards, financial accounts, etc.

The user interface 900 allows the user to manage aspects associated with these financial products, such as managing how credit is allocated. This can include changing how credit is distributed between two or more financial products and/or changing one or more of the financial products. The user interface 900 also allows the user to report income information. Other ways of managing financial products are also possible.

In the disclosed example, the user interface 900 includes a credit line adjustment option 902, a switch products option 904 and a report income information option 906. In other examples, additional and/or different options may also be presented to the user.

In some examples, the credit line adjustment option 902 allows users to control and manage several features related to credit lines. For example, upon selection of the credit line adjustment option 902, the user may be presented with several sub-options including options to reallocate credit lines, increase credit lines, and decrease credit lines. Other options are also possible.

For example, the sub-option to reallocate credit lines allow users to reallocate the entire line of credit from one credit card to another credit card, while retaining any minimum credit lines to keep the card account open. Alternatively, the credit line from one card can be combined with the credit line of another and one of the cards may be closed. The process of allocating credit lines is described in detail above in relation to FIG. 4.

For example, the sub-option to increase credit lines provides the users with the ability to request a credit line increase for one or more of the user's financial products and the sub-option to decrease credit lines provides the users with the ability to request a credit line decrease or opt-out of credit-line increases for one or more of the user's financial products. The process of adjusting the credit line for one or more of the user's financial products is described in detail above in relation to FIG. 3.

In some examples, the switch products option 904 allows the user to switch from one financial product to another financial product without having to close one product and re-apply and acquire another new financial product that is not currently owned by the user. Some of the advantages of switching products instead of opening/closing products include: not having to complete a new application, having the ability to carry-over the rewards points, balances or bonuses from the old product to the new product and retaining the promotional pricing from the old product to the new product if there is time remaining on the promotion. Selecting the switch products option 904 on the user interface 900 may display another user interface screen with one or more sub-options associated with the switching process. Examples of sub-options include: requesting new plastic to be sent, requesting a new account number, options for customizing the new card, etc.

In some examples, the user may make selections using the one or more sub-options that would lead to switching financial products within a same network associated with the financial product provider. In other examples, the user may make selections using the one or more sub-options that would lead to switching financial products to another network associated with a new financial products provider.

In some examples, switching within the same network includes switching from one product to another, where both products are provided by the same financial institution (e.g., same credit card processor). One example of in-network switch includes a switch from a Visa credit card to another Visa credit card. Depending on the card provider, the user may be able to select whether to receive a new card or retain the old card.

In other examples, switching across network includes switching from one product to another, where the products are not provided by the same financial institution (e.g., different credit card processors). One example of cross-network switch includes a switch from a Visa credit card to an American Express credit card. The product switch process is described in greater detail in relation to FIGS. 10-11 below.

In some examples, the user interface 900 also includes a report income information option 906. Upon selecting the report income information option 906, the user may enter the information associated with the user's current income levels. Such information can include the user's current income and associated employment information. The entered information may be used in association with the other options 902, 904 to assess user's eligibility for adjusting credit lines or switching products.

Figure 10:
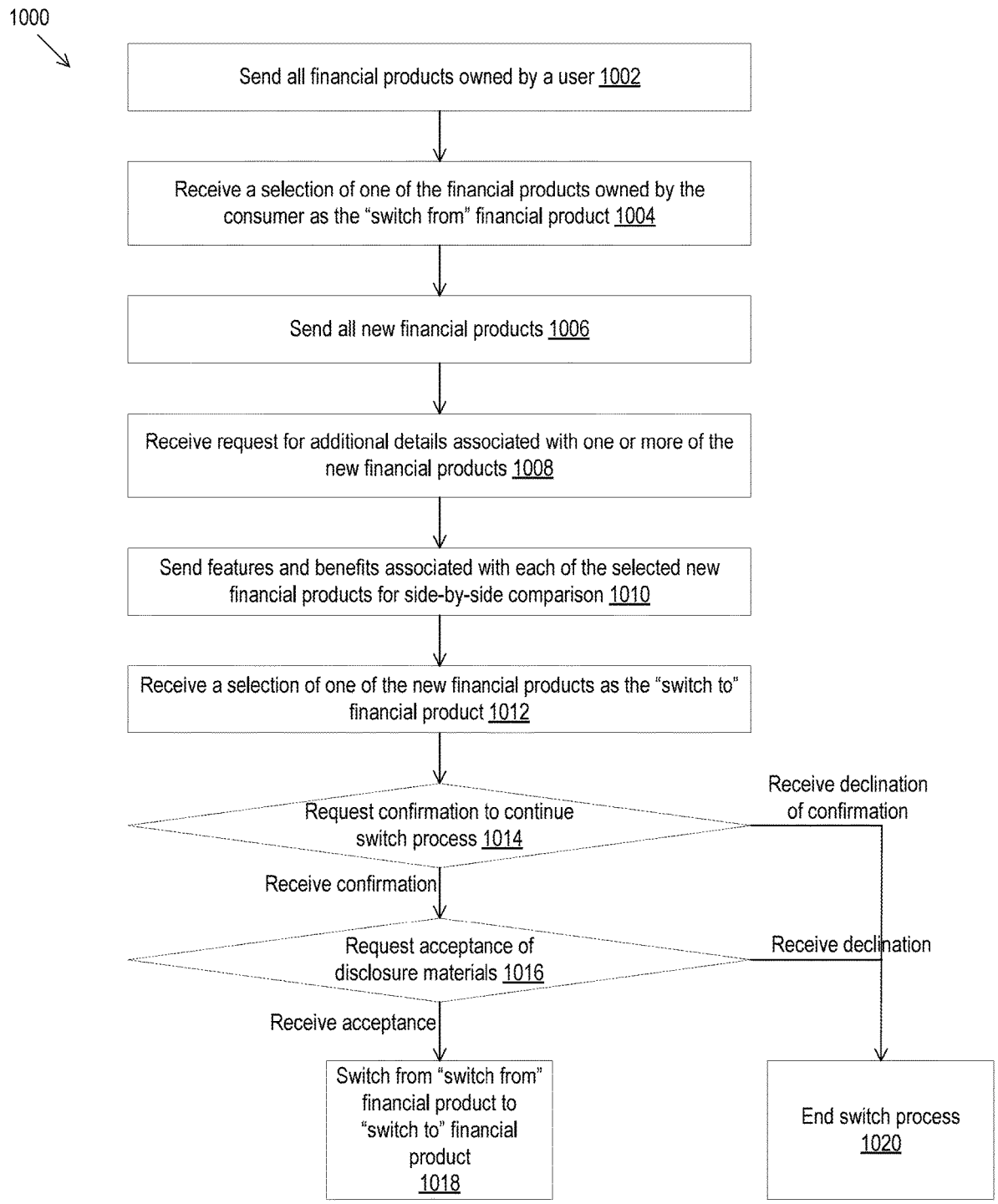
FIG. 10 is an example flow diagram illustrating an example of a product switch process.
Figure 11:
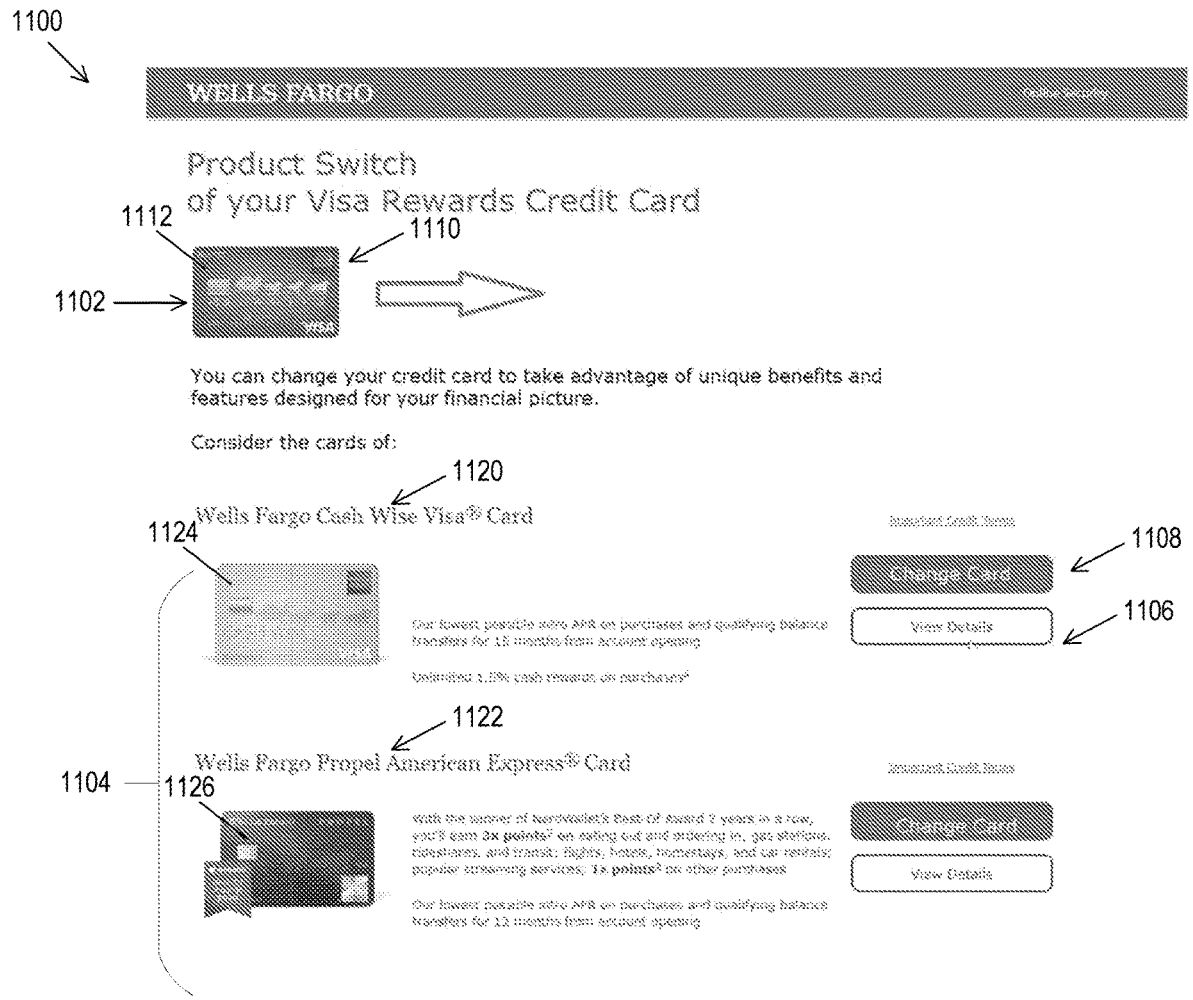
FIG. 11 is an example user interface display illustrating a product switch screen.

FIGS. 10-11 illustrate examples of product switches, where the user is presented with available financial products and allowed to select an existing financial product to be switched with a new financial product.

FIG. 10 is a flow diagram illustrating an example of a product switch process 1000.

The example process 1000 illustrates a switch from one financial product to another financial product. The process can be repeated to switch multiple products. In example step 1002, the system 100 sends data associated with each of the financial products owned by the user to the user device 104 for display on a screen on the user device 104. In some examples, the data associated with each of the financial products may include graphical elements depicting the financial product, such as an image of a credit card owned by the user. In other examples, the data associated with each of the financial products may also include feature details associated with the financial product, such as credit limit, expiration date, rewards balance, and other details regarding the financial product.

In example step 1004, the system 100 may receive a selection of one of the financial products owned by the consumer as the "switch from" financial product. For example, the "switch from" financial product is the product that the user currently owns and would switch out of. In some examples, the user may view the financial products displayed on the user interface screen from step 1002 and select one of the financial products as the "switch from" financial product. The user's selection may be transmitted to the system 100 from the user device 104.

In some examples, the financial product that are ineligible for the switch process may not be displayed or grayed out and not selectable by the user. In other examples, if a user selects an ineligible financial product as the "switch from" product, the user may be presented with a notice on the user interface screen of the user device 104 detailing the reasons why the product is ineligible for the switching process. The user may then be prompted to select another financial product to continue with the switching process or exit out of the switching process and return back to the user interface 900.

In example step 1006, the system 100 sends data associated with all new financial products to user device 104. For example, upon receiving the "switch from" financial product in step 1004, the user device sends data associated with all new financial products. The data may include graphical representations of the financial products, such as an image of the card and feature details associated with each of the new financial products, such as eligibility details, credit limits, expiration details, etc.

In some examples, only financial products that the user is eligible for are sent to the user device 104. For example, the system 100 evaluates, based on the user's current income level, credit history and account balances among other factors, whether the user is eligible to apply for a particular new financial product. The system 100 may then filter the list of new financial products to only include financial products that the user is eligible for and sends the data associated with the eligible new financial products to the user device 104. In other examples, the system 100 may send data associated with all new financial products to the user device 104.

In some examples, upon receiving the data associated with the new financial products, the user device may display the received data on the user interface screen of the user device 104. The user of the user device 104 may make selections associated with the new financial products displayed on the user interface screed on the user device 104.

In example step 1008, the system 100 may receive selections from the user device 104 requesting additional details associated with one or more of the new financial products. For example, the user device 104 may receive selections from the user requesting additional details associated with one or more of the new financial products that were displayed on the user interface screen following step 1006. In some examples, if the list of displayed new financial products includes products that the user is ineligible for and the user selects an ineligible new financial product, the user device 104 may display a notice to the user detailing the reasons for the user's ineligibility.

In example step 1010, the system 100 may send information on features and benefits associated with each of the selected new financial products for side by side comparison. Upon receiving the request for additional details associated with selected new financial products from the user device 104 in step 1008, the system 100 compiles additional data associated with each of the selected new financial products. The additional data may include details on the features and benefits of each of the selected new financial products. The compiled data may be sent to the user device 104 for display on the user interface screen for a concurrent or side-by-side comparison of the selected new financial products with each other and with the selected "switch to" financial product from step 1004.

In example step 1012, the system 100 receives a selection of one of the new financial products as the "switch to" financial product. In some examples, upon viewing the feature and benefit details associated with each of the new financial products, the user may be prompted to select one of the new financial products as the financial product to switch to. In other words, the user may select to switch from the selected "switch from" financial product in step 1004 to one of the displayed new financial products as the "switch to" financial product. For example, the selection of the "switch to" financial product from the user is sent from the user device 104 and received at the system 100.

In some examples, if the user is ineligible to switch to the selected new financial product, the user may be notified of the reasons for the ineligibility and may be further prompted to choose a different new financial product as the "switch to" financial product.

In example step 1014, the system 100 sends a request for confirmation of the selection from step 1012. The request is sent from the system 100 to the user device 104 to be displayed on the user interface screen of the user device 104.

In response to the request for confirmation, the user device 104 may present the user with a selectable option to "accept" selection or "decline" the confirmation request. If the system 100 does not receive a confirmation from the user device 104, the system 100 may proceed to step 1020 and end the switch process. Alternatively, if the system 100 does receive a confirmation from the user device 104, the system 100 may proceed with executing the switch process by proceeding to step 1016.

In some examples, instead of directly proceeding to step 1016, upon receiving a confirmation from the user device to proceed with the switch process, the system 100 may send an authentication request to the user device 104 in order to verify the identity of the user and mitigate the chances of unauthorized access. In one example, a switch process can only be executed by a primary account holder of the financial product. In such cases, the authentication process serves to verify that the switch process is being requested by the primary account holder. The authentication request may require authentication credential from the user. Authentication credentials may include a login name and password, security questions, or some other form of credentials. In case of a joint account, a secondary account holder may also be able to execute the switch process. In another example, the primary account holder may be able to designate a secondary account holder as being able to execute the switch process. In yet another example, the switch process may be executed by a banker or credit line management service when authorized to do so by the account holder through the phone, in-person or another platform.

In example step 1016, the system 100 sends disclosure materials to the user device 104 for the user device to display to the user on the user interface screen and requests for acceptance of the disclosure materials from the user. In some examples, disclosure materials include terms and conditions associated with the "switch to" financial product and the switch process itself. In order to process the switch request, the system 100 needs to ensure that the user has accepted the terms and conditions listed in the disclosure materials. If the system 100 receives a declination of the disclosure materials, the system 100 may proceed to step 1020 and end the switch process. Alternatively, if the system 100 receives an acceptance of the disclosure from the user device 104, the system 100 may proceed to step 1018 where the switch process is finalized.

In example step 1018, the system 100 switches the "switch from" financial product to the "switch to" financial product. For example, switching a product includes associating parameters and user preferences that were previously associated with the "switch from" financial product to the "switch to" financial product while adapting the features and benefits of the "switch to" financial product. In some examples, the reward balances and bonuses associated with the "switch from" financial product are transferred to the "switch to" financial product and any inconsistencies between the reward systems is resolved by converting the reward balances and bonuses into the "switch to" financial product format. For example, if the "switch from" product uses points and the "switch to" financial product uses cash as the reward balance, then upon successfully executing the switch from the "switch from" financial product to the "switch to" financial product, the reward points are converted to the equivalent cash values and associated with the "switch to" financial product.

In some examples, following a successful product switch, the system 100 reviews the user's account to determine whether the user is eligible for a credit line increase. Upon determining that the user is eligible for a credit line increase, the system 100 automatically causes the user device 104 to display the credit line increase sub-page option from the credit line adjustment option 902.

In some examples, once the switch is completed, the features and benefits unique to the "switch from" financial product is no longer available to the user. In an example where the financial product is a credit card, if the switch was an in-network switch (e.g. Visa card to Visa card), the user may retain the same card number. In other examples, if the switch is a cross network (e.g. Visa card to Amex card), the user may receive a new card with a new card number.

In other examples, following the successful product switch, the system 100 communicates an alert to the user through a secure communication method (e.g., secure session message, email or letter) that the product switch is complete and that the features and benefits of the "switch to" financial product is now available to the user. In some examples, new plastic or new card may be sent to the user via mail. In other examples, the user may retain the old card, but may enjoy the features and benefits of the new card.

In example step 1020, the system 100 ends the switch process. Upon exiting the switch process, the system 100 may enable the user device 104 to return to and display the user interface 900. The system 100 may then await further selections from the user device.

FIG. 11 is an example user interface 1100 illustrating a product switch screen. The user interface 1100 can be implemented on system 100 of FIG. 1 and be displayed to the user on the user device 104 in conjunction with the previous process 1000 described above. For example, the user interface 1100 includes a section 1102 including a "switch from" financial product 1110 on a first portion of the user interface screen.

The example user interface 1100 further displays a section 1104 displaying one or a plurality of possible new "switch to" financial products 1120, 1122 that the user may be interested in switching to. In some examples, the possible new "switch to" financial products 1120, 1122 may be a subset of the available new financial products that are selected based on one or more considerations. For example, considerations for selecting and displaying one or more new financial products include: the type of "switch from" financial product, the user's current financial status including current income levels, user's credit history, current financial products owned by the user, availability of other "in-network" financial products, etc.

In one example, the options for the "switch to" financial product are different than the financial products that the user already owns. In another example, if a user has selected their Visa platinum level credit card as the "switch from" card, the disclosed system is likely to select other credit cards that are of an equal or higher value to the user as the possible new "switch to" financial products. In other words, when the "switch from" financial product is a platinum level card, it is unlikely that an entry level Visa credit card is listed as an option in the list of "switch to" financial products because the user presumably wants to upgrade their current financial products.

In some examples, the plurality of possible new "switch to" financial products 1120, 1122 may be displayed side by side for easy comparison of the features and benefits associated with each of the financial products. In the disclosed example, the possible new "switch to" financial products 1120, 1122 are listed one under the other. In other examples, the possible new "switch to" financial products 1120, 1122 may be selectable such that the user interface 1100 may navigate to a secondary window or screen that displays the details of the card side by side for easy comparison. Other ways of listing the financial products 1120, 1122 are also possible.

In some examples, the display of the "switch from" financial product 1110 and the display of the plurality of possible new "switch to" financial products 1120, 1122 each includes a graphical image of the financial product itself. In the disclosed example, the financial product includes an image 1112 of a credit card and the sections 1102 and 1104 include images 1124, 1126 of the respective credit cards. In some examples, in addition to the image of the financial product, the sections 1102 and 1104 include some brief details associated with each of the financial products, such as name of the product and a brief summary of the features and benefits of the financial product.

Some example features associated with a credit card financial product may include: credit limit, interest rate/APR, credit card fees, grace periods, rewards/perks, etc. Some example benefits that credit card financial products may offer users include: a sign up bonus, access to credit-boosting tools, no balance transfer fee, reward points, purchase perks, cash back, travel perks, investment benefits, no annual fees, no penalty APR, zero percent interest, In some examples, the user interface 1100 includes selectable options 1106, 1108 adjacent to each of the plurality of possible new "switch to" financial products. In some examples, the "view details" option 1106 allows the user to request additional details associated with the card, including details associated with card features, benefits and terms and conditions. In other examples, the "change card" option 1108 allows the user to select the card as the "switch to" financial product out of all the possible new "switch to" financial products 1120, 1122.

For example, upon receipt of a selection of the "change card" option, the product switch process is initiated and operations 1014 to 1020 from FIG. 10 are executed. For example, upon receiving a selection of the "change card" option 1108, the user interface may display a request for confirmation. If the user confirms their intent to move forward with the switch process, the user interface 1100 may display or otherwise present the user with disclosure materials as described in detail with relation to operation 1016 of FIG. 10. Once the user has accepted the disclosure materials, the transition from the "switch from" financial product to the "switch to" financial product is executed.

The switch process itself may include transferring reward balances to the new financial product, presenting the user with options for credit line increases upon determining that the user is eligible for a credit line increase, sending communications or alerts to the user confirming the change in financial product and sending new cards if requested or required. Upon successful completion of the financial product switch, the features and benefits unique to the "switch from" financial product is no longer available to the user.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer implemented method to switch from a first financial product owned by a user to a second financial product that is new to the user, the method comprising:

generating a graphical user interface with a first section and a second section for display on a user device;

sending, to the user device for display on the first section of the graphical user interface, data associated with one or more financial products owned by the user;

receiving, via the first section of the graphical user interface, a selection of the first financial product having a first account number, wherein the first financial product is one of the one or more financial products owned by the user, and wherein the first financial product corresponds to a first credit card owned by the user;

sending, to the user device for display on the second section of the graphical user interface, data associated with one or more new financial products, wherein the one or more new financial products are automatically filtered by evaluating qualification data associated with the user to determine eligibility so that only eligible financial products are displayed in the second section, and wherein the data associated with the one or more new financial products includes information on features associated with each of the one or more new financial products that is displayed concurrently within the second section of the graphical user interface for side by side comparison of the features of the one or more new financial products, wherein the first section displays a graphical image of the first financial product and brief details including a name and a summary of the features and benefits of the first financial product, wherein the second section displays graphical images of the one or more new financial products side-by-side with a view details option and a change card option adjacent to each of the one or more new financial products, and wherein selection of the view details option causes the graphical user interface to display additional details associated with the features, benefits and terms and conditions of each of the one or more new financial products, receiving, via the second section of the graphical user interface, a selection of the second financial product, wherein the second financial product is one of the one or more new financial products, and wherein the first financial product and the second financial product are within a network; and switching from the first financial product to the second financial product, including:

transferring at least a portion of a first credit limit amount associated with the first financial product to the second financial product without closing the first financial product; and retaining the first credit card, including:

retaining the first account number as an account number for the second financial product; and causing first features of the first financial product to be unavailable to the user on the first credit card while simultaneously causing second features of the second financial product to be available to the user on the first credit card, wherein selection of the change card option initiates the transferring and causes the graphical user interface to display a confirmation request, wherein, upon receiving confirmation, the graphical user interface displays disclosure materials for acceptance before executing the transferring, and wherein, upon successful completion of the transferring, the graphical user interface displays an alert through a secure communication confirming the second financial product and indicating that features and benefits of the second financial product are now available.

2. The computer implemented method of claim 1, further comprising:
sending, to the user device for display on the graphical user interface associated with the user device a second option to adjust a credit line associated with at least one of the one or more financial products owned by the user;
receiving an input from the user device of a selection of the second option;
sending, for display on the graphical user interface of the user device, a credit line adjustment user interface, wherein the credit line adjustment user interface includes:
a third section identifying a third financial product owned by the user, the third section providing a third credit limit amount for the third financial product, and the third section including a first control that receives input from the user to manipulate the third credit limit amount; and
a fourth section identifying a fourth financial product, the fourth section including a second control that receives input to transfer at least a portion of the third credit limit amount to the fourth financial product.

3. The computer implemented method of claim 1, further comprising:
receiving, from the user device, a request for information associated with the one or more new financial products.

4. The computer implemented method of claim 1, further comprising:
sending a request for the user's authentication credentials to the user device;
in response to the request for the user's authentication credentials, receiving the user's authentication credentials from the user device;
determining whether the user's authentication credentials are valid;
upon determining that the user's authentication credentials are invalid, ending the switch; and
upon determining that the user's authentication credentials are valid, continuing the switch.

5. The computer implemented method of claim 1 further comprising:
sending the disclosure materials associated with the second financial product.

6. The computer implemented method of claim 5, further comprising:
in response to sending the disclosure materials, receiving a response from the user device;
determining whether the response is an acceptance or denial of the disclosure materials;
upon determining that the response is the acceptance of the disclosure materials, continuing the switch; and
upon determining that the response is the denial of the disclosure materials, ending the switch.

7. The computer implemented method of claim 1, wherein switching from the first financial product to the second financial product includes:
setting user parameter values of the second financial product based on user parameter values of the first financial product; and
transferring reward balances associated with the first financial product to the second financial product.

8. The computer implemented method of claim 7, wherein:

the user parameter values include: personal information associated with the user, account information associated with the user and user preferences set by the user.

9. A system to switch from a first financial product owned by a user to a second financial product that is new to the user, the system comprising:
at least one processor; and
memory encoding instructions that, when executed by the at least one processor, causes the at least one processor to:
generate a graphical user interface with a first section and second section for display on a user device;
send, to the user device for display on the first section of the graphical user interface, data associated with one or more financial products owned by the user, wherein the one or more new financial products are automatically filtered by evaluating qualification data associated with the user to determine eligibility so that only eligible financial products are displayed in the second section, and wherein the data associated with one or more new financial products includes information on features associated with each of the one or more new financial products that is displayed concurrently within the second section of the graphical user interface for side by side comparison of the features of the one or more new financial products,
wherein the first section displays a graphical image of the first financial product and brief details including a name and a summary of the features and benefits of the first financial product,
wherein the second section displays graphical images of the one or more new financial products side-by-side with a view details option and a change card option adjacent to each of the one or more new financial products, and
wherein selection of the view details option causes the graphical user interface to display additional details associated with the features, benefits and terms and conditions of each of the one or more new financial products,
receive, via the first section of the graphical user interface, a selection of the first financial product having a first account number, wherein the first financial product is one of the one or more financial products owned by the user and wherein the first financial product corresponds to a first credit card owned by the user;
send, to the user device for display on the second section of the graphical user interface, data associated with one or more new financial products;
receive, via the second section of the graphical user interface, a selection of the second financial product, wherein the second financial product is one of the one or more new financial products, and wherein the first financial product and the second financial product are within a network; and
switch from the first financial product to the second financial product, including to:
transfer at least a portion of a first credit limit amount associated with the first financial product to the second financial product without closing the first financial product; and
retaining the first credit card, including:
retaining the first account number as an account number for the second financial product; and cause first features of the first financial product to be unavailable to the user on the first credit card while simultaneously cause second features of the second financial product to be available to the user on the first credit card, wherein selection of the change card option initiates the transferring and causes the graphical user interface to display a confirmation request, wherein, upon receiving confirmation, the graphical user interface displays disclosure materials for acceptance before executing the transferring, and wherein, upon successful completion of the transferring, the graphical user interface displays an alert through a secure communication confirming the second financial product and indicating that features and benefits of the second financial product are now available.

10. The system of claim 9, wherein the instructions further case the at least one processor to:

send, to the user device for display on the graphical user interface associated with the user device an option to adjust a credit line associated with at least one of the one or more financial products owned by the user;

receive an input from the user device of a selection of the option;

send, for display on the graphical user interface of the user device, a credit line adjustment user interface, wherein the credit line adjustment user interface includes:

a third section identifying a third financial product owned by the user, the third section providing a third credit limit amount for the third financial product, and the third section including a first control that receives input from the user to manipulate the third credit limit amount; and a fourth section identifying a fourth financial product, the fourth section including a second control that receives input to transfer at least a portion of the third credit limit amount to the fourth financial product.

11. The system of claim 9, wherein the instructions further case the at least one processor to:

receive, from the user device, a request for information associated with the one or more new financial products.

12. The system of claim 9, wherein the instructions further case the at least one processor to:

send a request for the user's authentication credentials to the user device;

in response to the request for the user's authentication credentials, receive the user's authentication credentials from the user device;

determine whether the user's authentication credentials are valid;

upon determining that the user's authentication credentials are invalid, end the switch; and upon determining that the user's authentication credentials are valid, continue the switch.

13. The system of claim 9, wherein the instructions further case the at least one processor to:

send the disclosure materials associated with the second financial product.

14. The system of claim 13, wherein the instructions further case the at least one processor to:

in response to sending the disclosure materials, receive a response from the user device;

determine whether the response is an acceptance or denial of the disclosure materials;

upon determining that the response is the acceptance of the disclosure materials, continue the switch; and upon determining that the response is the denial of the disclosure materials, end the switch.

15. The system of claim 9, wherein to switch from the first financial product to the second financial product further includes:

setting user parameter values of the second financial product based on user parameter values of the first financial product; and transferring reward balances associated with the first financial product to the second financial product.

16. The system of claim 15, wherein:

the user parameter values include: personal information associated with the user, account information associated with the user and user preferences set by the user.

* * * * *